United States Patent
Parham, Jr. et al.

(10) Patent No.: US 10,518,867 B2
(45) Date of Patent: *Dec. 31, 2019

(54) LOOP YOKE FOR PROPROTOR SYSTEMS

(71) Applicant: Textron Innovations Inc., Providence, RI (US)

(72) Inventors: Thomas Clement Parham, Jr., Fort Worth, TX (US); Jouyoung Jason Choi, Fort Worth, TX (US); Gary Miller, Fort Worth, TX (US); Frank Bradley Stamps, Fort Worth, TX (US); Richard Erler Rauber, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 683 days.

This patent is subject to a terminal disclaimer.

(21) Appl. No.: 15/375,356

(22) Filed: Dec. 12, 2016

(65) Prior Publication Data

US 2018/0162518 A1 Jun. 14, 2018

(51) Int. Cl.
| | |
|---|---|
| *B64C 11/04* | (2006.01) |
| *B64C 11/06* | (2006.01) |
| *B29C 70/30* | (2006.01) |
| *B64C 27/00* | (2006.01) |
| *B64C 27/33* | (2006.01) |
| *B64C 27/35* | (2006.01) |

(Continued)

(52) U.S. Cl.
CPC .............. *B64C 11/04* (2013.01); *B29C 70/30* (2013.01); *B29C 70/32* (2013.01); *B64C 11/06* (2013.01); *B64C 27/00* (2013.01); *B64C 27/33* (2013.01); *B64C 27/35* (2013.01); *B64C 27/51* (2013.01); *B64C 27/54* (2013.01); *B64C 29/00* (2013.01); *B64C 29/0033* (2013.01); *B29K 2105/0881* (2013.01); *B29K 2307/04* (2013.01); *B29L 2031/3088* (2013.01)

(58) Field of Classification Search
CPC ......... B64C 27/33; B64C 27/35; B64C 27/37; B64C 27/51; B64C 27/54
See application file for complete search history.

(56) References Cited

U.S. PATENT DOCUMENTS

| | | |
|---|---|---|
| 3,494,706 A | 2/1970 | Gaffey et al. |
| 4,227,857 A | 10/1980 | Reyes |

(Continued)

*Primary Examiner* — Richard R. Green
*Assistant Examiner* — Steven J Shur
(74) *Attorney, Agent, or Firm* — Lawrence Youst PLLC

(57) ABSTRACT

A yoke for providing a centrifugal force retention load path between a proprotor blade and a hub of a soft-in-plane proprotor system operable for use on a tiltrotor aircraft. The yoke includes a continuous loop having a longitudinal axis and first and second longitudinal sections extending between inboard and outboard arcuate sections. A flapping bearing receiving region is disposed at least partially within the inboard arcuate section to an interior of the continuous loop. A centrifugal force bearing receiving region is disposed at least partially within the outboard arcuate section to the interior of the continuous loop. The continuous loop is formed from a composite material having a plurality of double bias material plies and a plurality of unidirectional material plies such that the number of unidirectional material plies is greater than the number of double bias material plies.

20 Claims, 14 Drawing Sheets

(51) Int. Cl.
*B64C 27/51* (2006.01)
*B64C 27/54* (2006.01)
*B64C 29/00* (2006.01)
*B29C 70/32* (2006.01)
*B29K 105/08* (2006.01)
*B29K 307/04* (2006.01)
*B29L 31/30* (2006.01)

(56) References Cited

U.S. PATENT DOCUMENTS

| | | | |
|---|---|---|---|
| 4,340,335 | A | 7/1982 | Cheney |
| 4,369,019 | A | 1/1983 | Lovera et al. |
| 4,419,051 | A | 12/1983 | DeRosa |
| 5,059,094 | A * | 10/1991 | Robinson ............... B64C 27/33 416/134 A |
| 5,431,538 | A * | 7/1995 | Schmaling ............ B29C 70/202 416/134 A |
| 5,620,305 | A | 4/1997 | McArdle |
| 6,641,365 | B2 | 11/2003 | Karem |
| 7,828,525 | B2 | 11/2010 | Stamps et al. |
| 7,845,909 | B2 | 12/2010 | Stamps et al. |
| 8,181,755 | B2 | 5/2012 | Stamps et al. |
| 8,955,792 | B2 | 2/2015 | Schank |
| 9,102,102 | B2 * | 8/2015 | Meyer ................... B29C 70/202 |
| 2008/0247876 | A1 * | 10/2008 | Stamps .................. B64C 27/35 416/140 |
| 2013/0048127 | A1 | 2/2013 | Bosworth et al. |
| 2013/0105637 | A1 | 5/2013 | Stamps et al. |
| 2013/0224022 | A1 | 8/2013 | Cabrera et al. |
| 2014/0248150 | A1 | 9/2014 | Sutton et al. |
| 2017/0197712 | A1 * | 7/2017 | Alber ................. B64C 29/0033 |

* cited by examiner

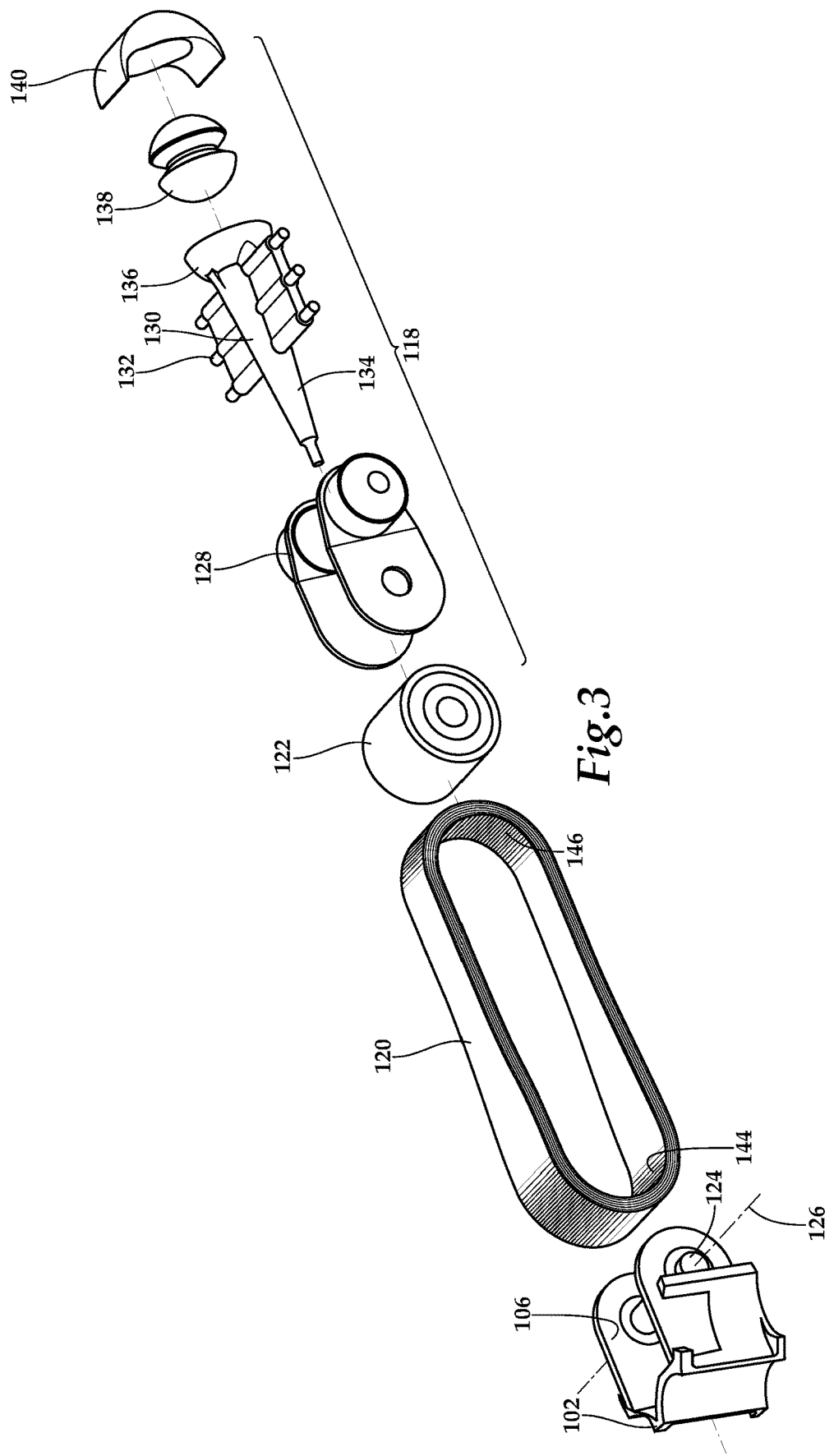

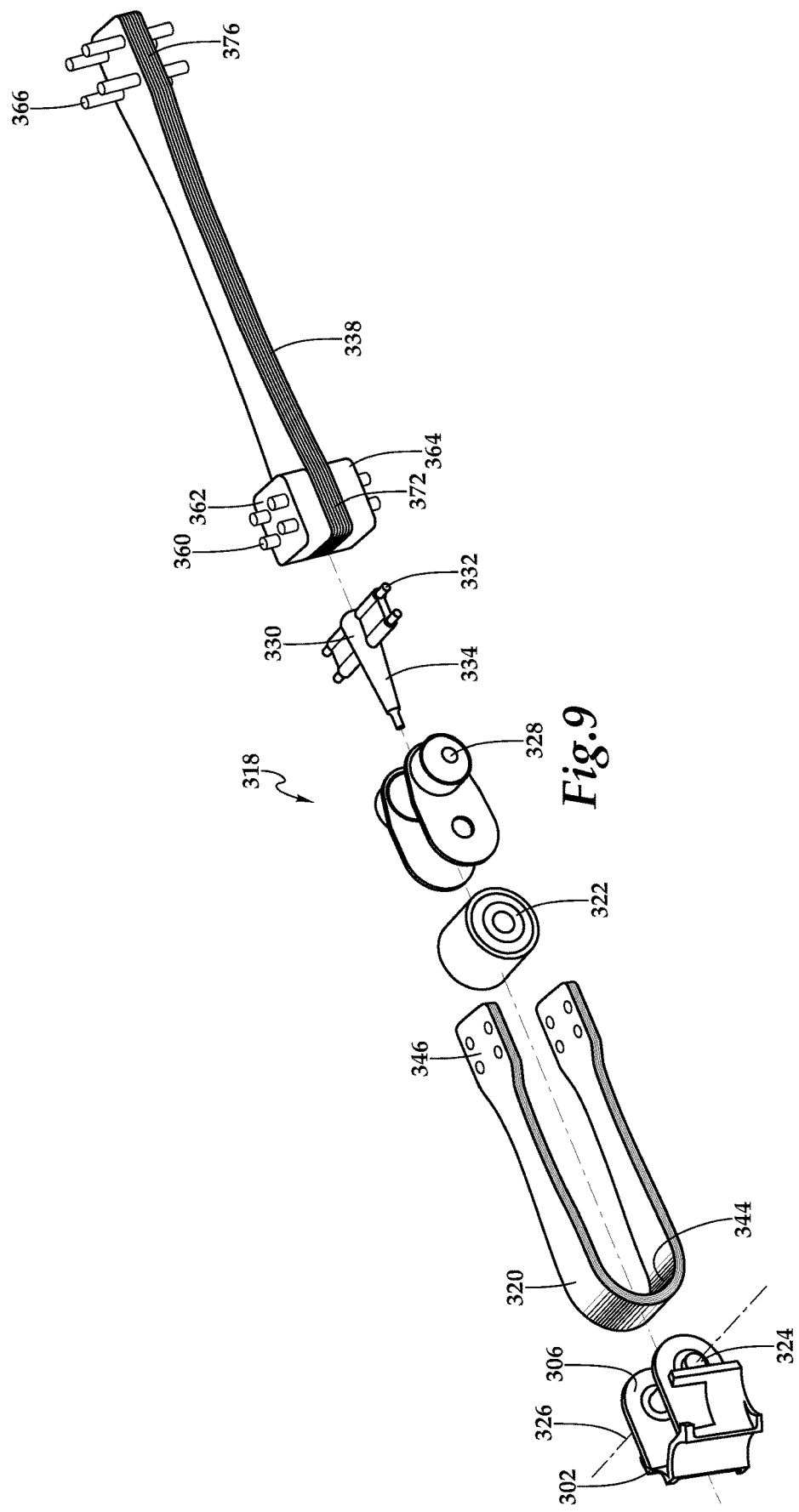

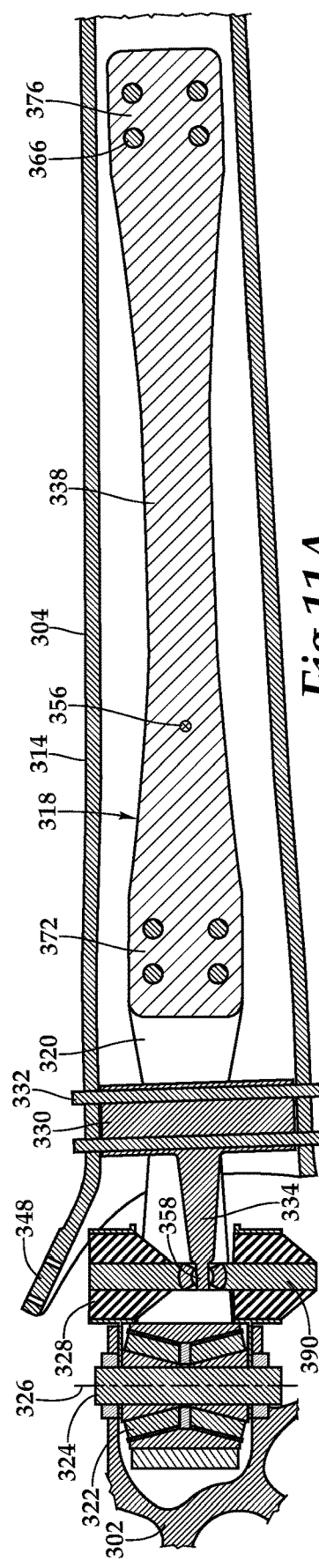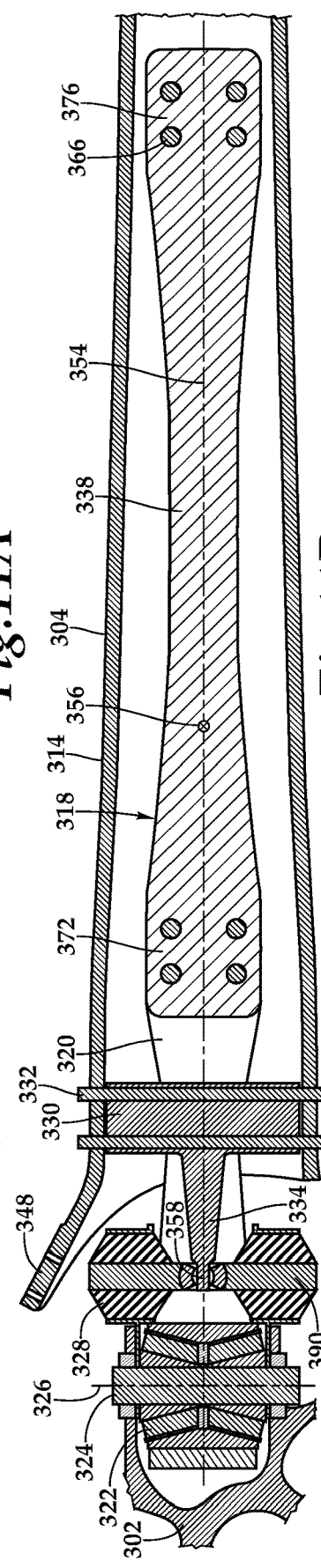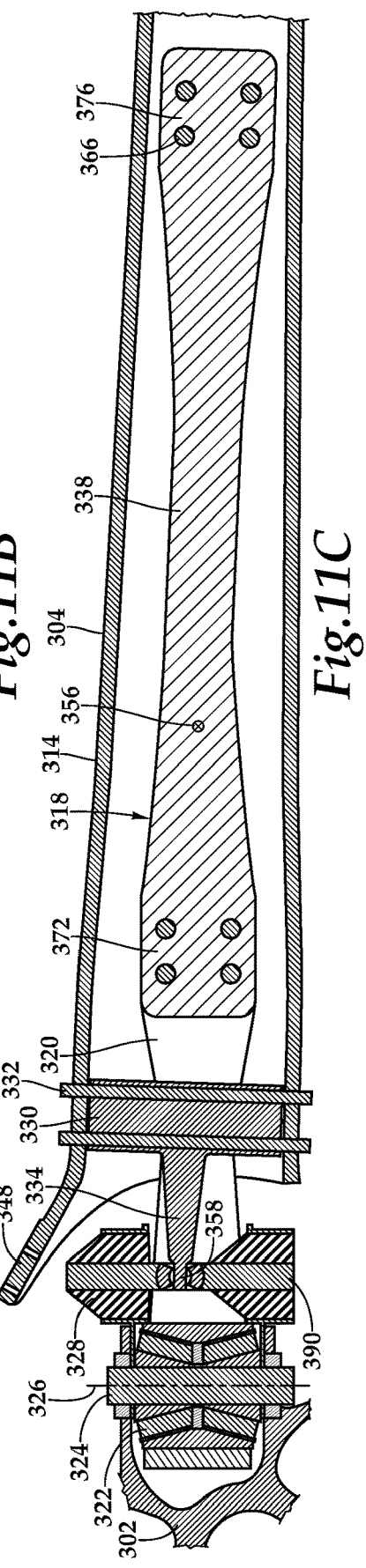

LOOP YOKE FOR PROPROTOR SYSTEMS

TECHNICAL FIELD OF THE DISCLOSURE

The present disclosure relates, in general, to rotor systems operable for use on rotorcraft and, in particular, to soft-in-plane proprotor systems including a hub and a plurality of proprotor blades operable for use on tiltrotor aircraft.

BACKGROUND

Tiltrotor aircraft typically include multiple propulsion assemblies that are positioned near outboard ends of a fixed wing. Each propulsion assembly may include an engine and transmission that provide torque and rotational energy to a drive shaft that rotates a proprotor systems including a hub and a plurality of proprotor blades. Typically, at least a portion of each propulsion assembly is rotatable relative to the fixed wing such that the proprotor blades have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. In addition, tiltrotor aircraft can be operated in configurations between the helicopter mode and the airplane mode, which may be referred to as conversion mode.

Physical structures have natural frequencies of vibration that can be excited by forces applied thereto as a result of operating parameters and environmental conditions. These frequencies are determined, at least in part, by the materials and geometrical dimensions of the structures. In the case of tiltrotor aircraft, certain structures having critical natural frequencies include the fuselage, the fixed wing and various elements of the propulsion assemblies. One important operating parameter of a tiltrotor aircraft is the angular velocity or revolutions per minute (RPM) of the proprotor blades, which may generate excitation frequencies corresponding to 1/rev (1 per revolution), 2/rev, 3/rev, etc. An important environmental condition experienced by tiltrotor aircraft is forward airspeed, which may induce proprotor aeroelastic instability, similar to propeller whirl flutter, that may couple to the fixed wing of tiltrotor aircraft. It has been found that forward airspeed induced proprotor aeroelastic instability is a limiting factor relating to the maximum airspeed of tiltrotor aircraft in airplane mode.

SUMMARY

In a first aspect, the present disclosure is directed to a proprotor system for tiltrotor aircraft having a helicopter mode and an airplane mode. The proprotor system includes a hub and a plurality of proprotor blades coupled to the hub such that each proprotor blade is operable to independently flap relative to the hub about a flapping axis and independently change pitch about a pitch change axis wherein, a first in-plane frequency of each proprotor blade is less than 1.0/rev.

In some embodiments, the first in-plane frequency of each proprotor blade may be between about 0.6/rev and about 0.9/rev. In one example, the first in-plane frequency of each proprotor blade in the helicopter mode may be between about 0.6/rev and about 0.7/rev and the first in-plane frequency of each proprotor blade in the airplane mode may be between about 0.8/rev and about 0.9/rev. In certain embodiments, the proprotor system may include at least four proprotor blades or at least five proprotor blades. In some embodiments, a pitch control assembly having a positive delta 3 angle may be operably coupled to each proprotor blade. In such embodiments, the positive delta 3 angle may be up to about 35 degrees.

In certain embodiments, in the airplane mode, the proprotor system may be operable between about 70 percent and about 80 percent of design RPM, the expected RPM in helicopter mode. In other embodiments, in the airplane mode, the proprotor system may be operable between about 60 percent and about 70 percent of design RPM, between about 50 percent and about 60 percent of design RPM and/or between about 40 percent and about 50 percent of design RPM. In some embodiments, a lead-lag damper may be disposed between each proprotor blade and the hub. In such embodiments, the lead-lag dampers may be elastomeric dampers or fluid dampers.

In a second aspect, the present disclosure is directed to a tiltrotor aircraft having a helicopter mode and an airplane mode. The tiltrotor aircraft includes a fuselage, a wing extending from the fuselage, at least one drive system supported by at least one of the fuselage and the wing and at least one proprotor system coupled to the drive system. The proprotor system includes a hub and a plurality of proprotor blades coupled to the hub such that each proprotor blade is operable to independently flap relative to the hub about a flapping axis and independently change pitch about a pitch change axis wherein, a first in-plane frequency of each proprotor blade is less than 1.0/rev.

In a third aspect, the present disclosure is directed to a soft-in-plane proprotor system operable for use on a tiltrotor aircraft having a helicopter mode and an airplane mode. The proprotor system includes a hub and a plurality of proprotor blades coupled to the hub such that each proprotor blade is operable to independently flap relative to the hub about a flapping axis and independently change pitch about a pitch change axis. Each of a plurality of loop yokes couples one of the proprotor blades with the hub and includes first and second longitudinal sections extending between inboard and outboard arcuate sections. A bearing assembly is disposed between the inboard and outboard arcuate sections of each loop yoke. Each bearing assembly includes a flapping bearing disposed generally within the inboard arcuate section of the respective loop yoke and coupled to the hub, a lead-lag damper coupled to the hub, a centrifugal force bearing disposed generally within the outboard arcuate section of the respective loop yoke and a blade anchor coupled between the lead-lag damper and the centrifugal force bearing. The blade anchor is also coupled to the respective proprotor blade.

In some embodiments, the first in-plane frequency of each proprotor blade may be less than 1.0/rev. In such embodiments, the first in-plane frequency of each proprotor blade may be between about 0.6/rev and about 0.9/rev. In one example, the first in-plane frequency of each proprotor blade in the helicopter mode may be between about 0.6/rev and about 0.7/rev and the first in-plane frequency of each proprotor blade in the airplane mode may be between about 0.8/rev and about 0.9/rev. In certain embodiments, the proprotor system may include at least four proprotor blades or at least five proprotor blades. In some embodiments, a pitch control assembly having a positive delta 3 angle may be operably coupled to each proprotor blade. In such embodiments, the positive delta 3 angle may be up to about 35 degrees.

In certain embodiments, the loop yokes may be formed from a composite material having a plurality of double bias material plies and a plurality of unidirectional material plies with multiple unidirectional material plies interposed between the double bias material plies and with a ratio of unidirectional material plies to double bias material plies between about 2 to 1 and about 6 to 1. In some embodiments, the flapping bearings may be twin conical elastomeric flapping bearings, the lead-lag dampers may be elastomeric dampers or fluid dampers and may have a spring rate and/or the centrifugal force bearings may be twin spherical elastomeric bearings. In certain embodiments, each bearing assembly may include a bearing support disposed between the centrifugal force bearing and the outboard arcuate section of the loop yoke.

In a fourth aspect, the present disclosure is directed to a tiltrotor aircraft having a helicopter mode and an airplane mode. The aircraft includes a fuselage, a wing extending from the fuselage and at least one drive system supported by the fuselage or the wing. At least one soft-in-plane proprotor system is coupled to the drive system. The proprotor system includes a hub and a plurality of proprotor blades coupled to the hub such that each proprotor blade is operable to independently flap relative to the hub about a flapping axis and independently change pitch about a pitch change axis. Each of a plurality of loop yokes couples one of the proprotor blades with the hub and includes first and second longitudinal sections extending between inboard and outboard arcuate sections. A bearing assembly is disposed between the inboard and outboard arcuate sections of each loop yoke. Each bearing assembly includes a flapping bearing disposed generally within the inboard arcuate section of the respective loop yoke and coupled to the hub, a lead-lag damper coupled to the hub, a centrifugal force bearing disposed generally within the outboard arcuate section of the respective loop yoke and a blade anchor coupled between the lead-lag damper and the centrifugal force bearing. The blade anchor is also coupled to the respective proprotor blade.

In a fifth aspect, the present disclosure is directed to a yoke for providing a centrifugal force retention load path between a proprotor blade and a hub of a soft-in-plane proprotor system operable for use on a tiltrotor aircraft. The yoke includes a continuous loop having a longitudinal axis and first and second longitudinal sections extending between inboard and outboard arcuate sections. A flapping bearing receiving region is disposed at least partially within the inboard arcuate section to an interior of the continuous loop. A centrifugal force bearing receiving region is disposed at least partially within the outboard arcuate section to the interior of the continuous loop. The continuous loop is formed from a composite material having a plurality of double bias material plies and a plurality of unidirectional material plies wherein, the number of unidirectional material plies is greater than the number of double bias material plies.

In some embodiments, the composite material of the continuous loop may include multiple unidirectional material plies interposed between the double bias material plies. In such embodiments, a preferred ratio of unidirectional material plies to double bias material plies may be between about 2 to 1 and about 6 to 1, a more preferred ratio of unidirectional material plies to double bias material plies may be between about 3 to 1 and about 5 to 1 and a most preferred ratio of unidirectional material plies to double bias material plies may be about 4 to 1. In certain embodiments, the double bias material plies of the composite material of the continuous loop may be double bias carbon fiber fabric such as double bias carbon fiber fabric with plus and minus 45 degree orientation relative to the longitudinal axis of the continuous loop. In some embodiments, the unidirectional material plies of the composite material of the continuous loop may be unidirectional carbon fiber fabric such as unidirectional carbon fiber fabric with 0 degree orientation relative to the longitudinal axis of the continuous loop. In certain embodiments, the first and second longitudinal sections may be generally parallel to one another. In some embodiments, the first and second longitudinal sections may be tapered between the inboard arcuate section toward the outboard arcuate section.

In a sixth aspect, the present disclosure is directed to a yoke manufacturing method for yokes comprising a continuous loop having a longitudinal axis and first and second longitudinal sections extending between inboard and outboard arcuate sections forming a flapping bearing receiving region at least partially within the inboard arcuate section and a centrifugal force bearing receiving region at least partially within the outboard arcuate section to the interior of the continuous loop, the yokes providing centrifugal force retention load paths between proprotor blades and a hub of a soft-in-plane proprotor system operable for use on a tiltrotor aircraft. The method includes providing a mandrel; laying up a plurality of double bias material plies and a plurality of unidirectional material plies on the mandrel in a sequence including: (a) laying up a double bias material ply; (b) laying up a plurality of unidirectional material plies; (c) repeating steps (a) and (b) to achieve a predetermined thickness; and (d) laying up a double bias material ply; curing the material plies with a resin to form a cured yoke assembly; cutting the cured yoke assembly into a plurality of yoke members; and finishing the yoke members to form the yokes.

In a seventh aspect, the present disclosure is directed to a tiltrotor aircraft. The aircraft includes a fuselage, a wing extending from the fuselage and at least one drive system supported by the fuselage or the wing. At least one soft-in-plane proprotor system is coupled to the drive system. The proprotor system includes a plurality of proprotor blades each supported by a hub via a yoke. Each yoke includes a continuous loop having a longitudinal axis and first and second longitudinal sections extending between inboard and outboard arcuate sections. A flapping bearing receiving region is disposed at least partially within the inboard arcuate section to an interior of the continuous loop. A centrifugal force bearing receiving region is disposed at least partially within the outboard arcuate section to the interior of the continuous loop. The continuous loop is formed from a composite material having a plurality of double bias material plies and a plurality of unidirectional material plies wherein, the number of unidirectional material plies is greater than the number of double bias material plies.

In an eighth aspect, the present disclosure is directed to a soft-in-plane proprotor system operable for use on a tiltrotor aircraft having a helicopter mode and an airplane mode. The proprotor system includes a hub and a plurality of proprotor blades coupled to the hub such that each proprotor blade is operable to independently flap relative to the hub about a flapping axis and independently change pitch about a pitch change axis. A blade support assembly couples each of the proprotor blades with the hub. Each of the blade support assemblies includes a flapping bearing coupled to the hub and a yoke having first and second longitudinal sections with outboard grip members and an inboard arcuate section connecting the first and second longitudinal sections and coupled to the flapping bearing. A lead-lag damper is coupled between the hub and an inboard station of the respective proprotor blade. A twist shank is coupled between the outboard grip members of the yoke and an outboard station of the respective the proprotor blade. The twist shank defines a virtual lead-lag hinge outboard of the yoke and coincident with the respective pitch change axis.

In some embodiments, a first in-plane frequency of each proprotor blade may be less than 1.0/rev such as a first in-plane frequency of between about 0.6/rev and about 0.9/rev. In such embodiments, the first in-plane frequency of each proprotor blade may be between about 0.6/rev and about 0.7/rev in the helicopter mode and between about 0.8/rev and about 0.9/rev in the airplane mode. In certain embodiments, each twist shank may be operable to twist in a collective range between about plus 50 degrees and about minus 50 degrees. Alternatively or additionally, each twist shank may have an in-plane spring rate. In some embodiments, each twist shank may be a beam having an inboard end, a central section and an outboard end wherein, the beam may have a generally tapered section from the inboard end toward the central section and from the outboard end toward the central section.

In certain embodiments, the virtual lead-lag hinge may be disposed between about a 15 percent station and about a 40 percent station of the twist shank. In such embodiments the virtual lead-lag hinge may be disposed between about a 20 percent station and about a 30 percent station of the twist shank. In some embodiments, each twist shank may be formed from a plurality of material layers including a plurality of high strength layers having resilient layers interposed therebetween such as a plurality of fiberglass layers having rubber layers interposed therebetween. In certain embodiments, the proprotor system may include at least four proprotor blades. In other embodiments, the proprotor system may include at least five proprotor blades. In some embodiments, a pitch control assembly having a positive delta 3 angle may be operably coupled to each proprotor blade.

In a ninth aspect, the present disclosure is directed to a tiltrotor aircraft having a helicopter mode and an airplane mode. The tiltrotor aircraft includes a fuselage, a wing extending from the fuselage, at least one drive system supported by at least one of the fuselage and the wing and at least one soft-in-plane proprotor system coupled to the drive system. The proprotor system includes a hub, a plurality of proprotor blades coupled to the hub such that each proprotor blade is operable to independently flap relative to the hub about a flapping axis and independently change pitch about a pitch change axis and a plurality of blade support assemblies, each coupling one of the proprotor blades with the hub. Each blade support assembly includes a flapping bearing coupled to the hub and a yoke having first and second longitudinal sections with outboard grip members and an inboard arcuate section connecting the first and second longitudinal sections and coupled to the flapping bearing. A lead-lag damper is coupled between the hub and an inboard station of the respective proprotor blade. A twist shank is coupled between the outboard grip members of the yoke and an outboard station of the respective the proprotor blade. The twist shank defines a virtual lead-lag hinge outboard of the yoke and coincident with the respective pitch change axis.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 3 is an exploded view of a bearing assembly and a loop yoke of a proprotor system for use on a tiltrotor aircraft in accordance with embodiments of the present disclosure;

FIG. 9 is an exploded view of a blade support assembly of a proprotor system for use on a tiltrotor aircraft in accordance with embodiments of the present disclosure;

FIGS. 11A-11C are cross sectional views depicting a blade support assembly during in-plane oscillation of a proprotor blade of a proprotor system for use on a tiltrotor aircraft in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
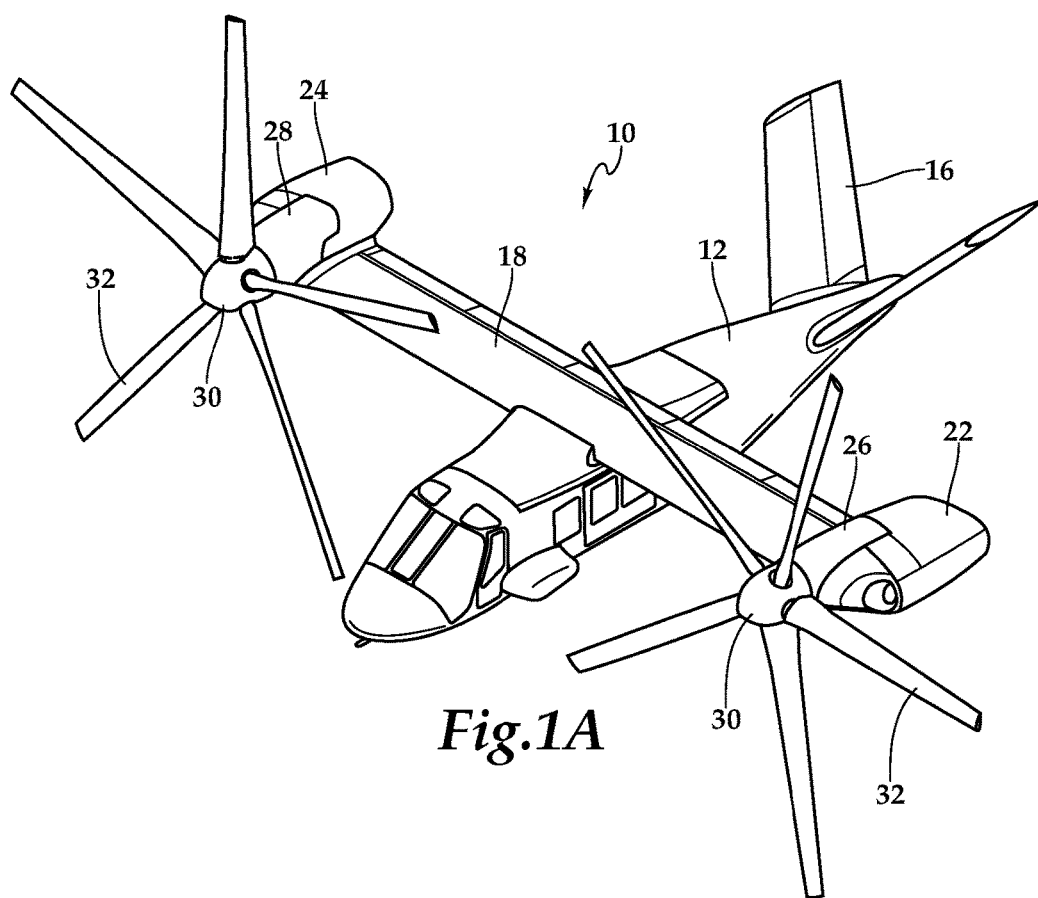
FIGS. 1A-1B are schematic illustrations of a tiltrotor aircraft in an airplane mode and a helicopter mode, respectively, in accordance with embodiments of the present disclosure.
Figure 1B:
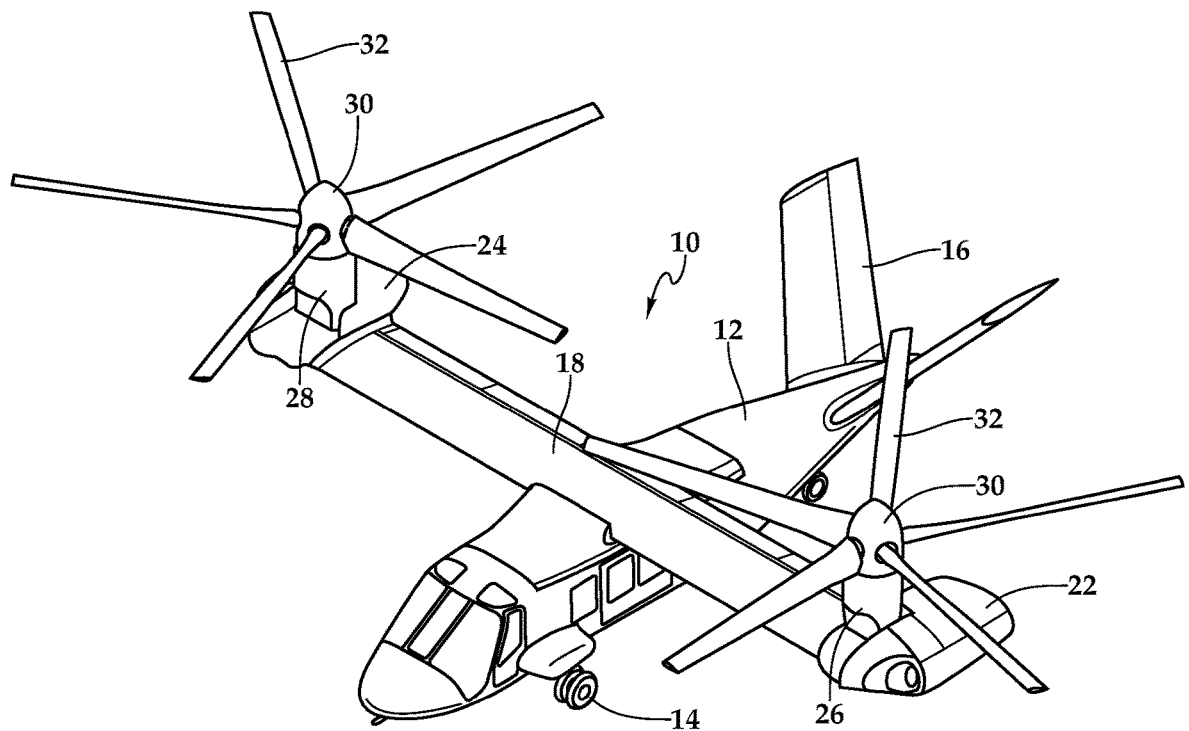

Referring to FIGS. 1A and 1B in the drawings, a tiltrotor aircraft is schematically illustrated and generally designated 10. Tiltrotor aircraft 10 includes a fuselage 12, landing gear 14, a tail member 16, a wing 18 and housings 22, 24. Wing 18 is supported by fuselage 12 and may be rotatable relative to fuselage 12 to place aircraft 10 in a storage mode wherein wing 18 is generally parallel with fuselage 12. In the illustrated embodiment, housings 22, 24 are fixedly attached in a generally horizontal orientation to outboard ends of wing 18 and are non-rotatable relative to wing 18. Mounted above wing 18 are pylons 26, 28 that are at least partially rotatable relative to wing 18 and housings 22, 24. Each pylon includes a proprotor system 30 having a plurality of proprotor blades 32. It should be understood by those having ordinary skill in the art that even though the illustrated embodiment depicts proprotor systems having five proprotor blades, a proprotor system of the present disclosure could have alternate numbers of proprotor blades both greater than or less than five including proprotor systems having three proprotor blades, proprotor systems having four proprotor blades or proprotor systems having at least six proprotor blades. The position of pylons 26, 28, the angular velocity or revolutions per minute (RPM) of the proprotor systems 30, the pitch of proprotor blades 32 and the like are determined using a flight control system, with or without pilot input, to selectively control the direction, thrust and lift of tiltrotor aircraft 10 during flight.

It should be understood by those having ordinary skill in the art that teachings of certain embodiments relating to the proprotor systems of the present disclosure described herein may apply to aircraft other than tiltrotor aircraft, such as non-tilting rotorcraft including helicopter rotor systems. In addition, it should be understood by those having ordinary skill in the art that teachings of certain embodiments relating to the proprotor systems of the present disclosure described herein may apply to aircraft other than rotorcraft, such as airplanes and unmanned aircraft, to name a few examples.

FIG. 1A illustrates tiltrotor aircraft 10 in a forward flight mode or airplane mode, in which proprotor systems 30 are positioned to rotate in a substantially vertical plane of rotation to provide a forward thrust while a lifting force is supplied by wing 18 such that tiltrotor aircraft 10 flies much like a conventional propeller driven aircraft. FIG. 1B illustrates tiltrotor aircraft 10 in a vertical takeoff and landing flight mode or helicopter mode, in which proprotor systems 30 are positioned to rotate in a substantially horizontal plane of rotation to provide a vertical thrust such that tiltrotor aircraft 10 flies much like a conventional helicopter. During flight operations, tiltrotor aircraft 10 may convert from helicopter mode to airplane mode following vertical takeoff or hover and may convert back to helicopter mode from airplane mode for hover or vertical landing. In addition, tiltrotor aircraft 10 can perform certain flight maneuvers with proprotor systems 30 positioned between airplane mode and helicopter mode, which can be referred to as conversion mode.

Preferably, each housing 22, 24 may be a nacelle having a drive system, such as an engine and transmission, disposed therein for supplying torque and rotational energy to a respective proprotor system 30. In such embodiments, the drive systems within each housing 22, 24 may be coupled together via one or more drive shafts located in wing 18 such that either drive system can serve as a backup to the other drive system in the event of a failure. Alternatively or additionally, fuselage 12 may include a drive system, such as an engine and transmission, for providing torque and rotational energy to each proprotor system 30 via one or more drive shafts located in wing 18. In tiltrotor aircraft having nacelle and fuselage mounted drive systems, the fuselage mounted drive system may serve as a backup drive system in the event of failure of either or both of the nacelle mounted drive systems.

In general, proprotor systems for tiltrotor aircraft should be designed to achieve blade flap or out-of-plane frequencies and lead-lag or in-plane frequencies that are sufficiently distant from the excitation frequencies generated by the proprotor systems corresponding to 1/rev (1 per revolution), 2/rev, 3/rev, etc. As an example, if a proprotor system has an operating speed of 360 RPM, the corresponding 1/rev excitation frequency is 6 Hertz (360/60=6 Hz). Similarly, the corresponding 2/rev excitation frequency is 12 Hz and the corresponding 3/rev excitation frequency is 18 Hz. It should be understood by those having ordinary skill in the art that a change in the operating speed of a proprotor system will result in a proportional change in the excitation frequencies generated by the proprotor system. For tiltrotor aircraft, flight in airplane mode typically requires less thrust than flight in helicopter mode. One way to reduce thrust as well as increase endurance, reduce noise levels and reduce fuel consumption is to reduce the operating speed of the proprotor systems. For example, in helicopter mode, the tiltrotor aircraft may operate at 100 percent of design RPM, but in airplane mode, the tiltrotor aircraft may operate at a reduced percent of design RPM such as between about 80 percent and about 90 percent of design RPM, between about 70 percent and about 80 percent of design RPM, between about 60 percent and about 70 percent of design RPM, between about 50 percent and about 60 percent of design RPM and/or between about 40 percent and about 50 percent of design RPM. Thus, to achieve desirable rotor dynamics, the proprotor systems for tiltrotor aircraft should be designed to avoid the frequencies of 1/rev, 2/rev, 3/rev, etc. for both helicopter mode and airplane mode operations.

To achieve acceptable rotor dynamics, conventional tiltrotor aircraft have operated proprotor systems having three twisted proprotor blades utilizing negative 15 degrees delta 3 pitch-flap coupling and having a first-in-plane frequency in airplane mode of about 1.4/rev. Delta 3 refers to the angle measured about the rotational axis of the proprotor system from an axis normal to the pitch change axis to the pitch horn attachment point of a proprotor blade. Delta 3 pitch-flap coupling is used to reduce or control the degree of blade flapping by automatically changing the blade pitch as the blade flaps up or down relative to its flap axis. It is noted that to achieve desired stability for a conventional helicopter, when a blade raises about its flap axis, the blade pitch is reduced by the delta 3 pitch-flap coupling, which is known as positive delta 3 (flap up/pitch down). To achieve desired stability for a conventional tiltrotor aircraft, however, when a blade raises about its flap axis, the blade pitch is increased by the delta 3 pitch-flap coupling, which is known as negative delta 3 (flap up/pitch up).

During high speed airplane mode flight, it is important to control proprotor blade flapping on a tiltrotor aircraft, as the forward airspeed may induce proprotor aeroelastic instability, similar to propeller whirl flutter, that may couple to the wing and lead to failures. In addition, it can be important to maintain the flapping frequency sufficiently distant from the first-in-plane frequency. To achieve this balance, conventional tiltrotor aircraft have utilized a negative delta 3 angle of 15 degrees. Due to the location requirements for the pitch links and pitch horns necessary to achieve the negative 15 degrees delta 3 configuration, proprotor systems have been limited to the conventional three blade design. It is noted that for reasons including pilot fatigue, passenger comfort, noise reduction and vibration induced mechanical failures, to name a few, it is desirable to have more than three proprotor blades on each proprotor system of a tiltrotor aircraft.

In the illustrated embodiment, each proprotor system 30 includes five proprotor blades 32 that are positioned circumferentially about a hub at approximately seventy-two degree intervals. Preferably, proprotor blades 32 are formed from a high-strength and lightweight material. For example, the structural components of proprotor blades 32 may be formed from carbon-based materials such as graphite-based materials, graphene-based materials or other carbon allotropes including carbon nanostructure-based materials such as materials including single-walled and multi-walled carbon nanotubes. In one example, the spar and/or skin of proprotor blades 32 are preferably monolithic structures formed using a broad goods and/or layered tape construction process having a manual or automated layup of a plurality of composite broad goods material layers including carbon fabrics, carbon tapes and combinations thereof, positioned over one or more mandrels having simple geometric surfaces with smooth transitions. After curing and other processing steps, the material layers form high-strength, lightweight solid composite members. In this process, the material thicknesses of the components can be tailoring spanwise and chordwise to achieve the desired properties. The proprotor blade components may be composed of up to about 50 percent, about 60 percent, about 70 percent, about 80 percent, about 90 percent or more of the carbon-based material or materials.

Proprotor blades 32 are preferably designed to a desired stiffness and/or stiffness to mass ratio such that when operated within the proprotor systems of the present disclosure, the first-in-plane frequency of proprotor blades 32 is below 1.0/rev. For example, the first in-plane frequency of proprotor blades 32 may be between about 0.6/rev and about 0.9/rev. In this example, the first in-plane frequency of proprotor blades 32 in the helicopter mode of tiltrotor aircraft 10 may be between about 0.6/rev and about 0.7/rev and the first in-plane frequency of proprotor blades 32 in the airplane mode of tiltrotor aircraft 10 may be between about 0.8/rev and about 0.9/rev. Maintaining the first-in-plane frequency below 1.0/rev decouples the first-in-plane lead-lag frequency from the per revolution excitations frequencies and the out-of-plane flapping frequency. This decoupling allows a shift from the conventional negative 15 degrees delta 3 configuration to a positive delta 3 configuration including up to about a positive 35 degrees delta 3 configuration. Using the disclosed positive delta 3 configuration, the location requirements of the pitch links and pitch horns no longer limit the proprotor design to the conventional three blade configuration and enable the five blade configurations of embodiments herein. In other embodiments, a negative delta 3 can be used with the proprotor systems of the present disclosure.

Referring next to FIGS. 2A-2D in the drawings, a soft-in-plane proprotor system for tiltrotor aircraft is depicted and generally designated 100. In the illustrated embodiment, proprotor system 100 includes a hub 102 having five proprotor blades 104 coupled thereto at respective grip members depicted as devises 106 of hub 102. Hub 102 is attached to and rotates with mast 108, which is coupled to a drive system including an engine and transmission of the tiltrotor aircraft that provides torque and rotational energy to proprotor system 100 to enable rotation about rotational axis 110. In the illustrated embodiment, each proprotor blade 104 includes an outer skin 112 having a spar 114 that extends spanwise toward the tip of proprotor blade 104. Spars 114 are preferably the main structural member of proprotor blades 104 designed to carry the primary centrifugal and bending loads of proprotor blades 104. Proprotor blades 104 may have a root-to-tip twist on the order of about 20 degrees to about 40 degrees or other suitable root-to-tip twist.

Each spar 114 has a root section depicted as integral cuff 116 to enable coupling of each proprotor blade 104 with a respective bearing assembly 118 disposed within a loop yoke 120. As best seen in FIG. 3, each bearing assembly 118 includes a flapping bearing 122 coupled to a clevis 106 of hub 102 by a connecting member depicted as pin 124. As used herein, the term "coupled" may include direct or indirect coupling by any means, including moving and/or non-moving mechanical connections. As illustrated, flapping bearing 122 is a twin conical elastomeric flapping bearing operable to allow a proprotor blade 104 to rotate or have a flapping degree of freedom relative to hub 102 about a flapping axis 126 that passes through pin 124. Flapping bearing 122 may be formed from one or more elastomeric members or layers and may include rigid shims disposed between elastomeric layers. The durometer and thickness of the materials as well as the stiffness of flapping bearing 122 may be tailored to achieve the desired operational modes based upon the loads and motions expected in the particular application.

Each bearing assembly 118 also includes a lead-lag damper 128 coupled to a clevis 106 of hub 102 by pin 124. As illustrated, lead-lag damper 128 is an elastomeric damper having a spring rate operable to apply a damping force to the lead-lag degree of freedom of a proprotor blade 104 and to tune the first-in-plane lead-lag frequency of in-plane oscillation of a proprotor blade 104. Lead-lag damper 128 may include a plurality of rigid shims disposed between layers of the elastomeric material. The durometer and thickness of the materials as well as the softness and/or a spring rate of lead-lag damper 128 may be tailored to achieve the desired operational modes based upon the loads and motions expected in the particular application.

In addition, each bearing assembly 118 includes a blade anchor 130 that has a plurality of pins 132 for connection to a spar 114 of a proprotor blade 104. In the illustrated embodiment, the in-plane oscillation of a proprotor blade 104 is coupled to lead-lag damper 128 by blade anchor 130 via blade anchor extension 134 that is coupled to lead-lag damper 128. Blade anchor 130 has a bearing support 136 proximate its outboard end.

Each bearing assembly 118 further includes a centrifugal force bearing 138. As illustrated, centrifugal force bearing 138 is a twin spherical elastomeric bearing having a pair of oppositely disposed spherical surfaces, the first of which corresponds to a spherical surface of bearing support 136 of blade anchor 130 and the second of which corresponds to a spherical surface of bearing support 140 that is securably coupled to an outboard portion of loop yoke 120. The connections between centrifugal force bearing 138 and loop yoke 120 at bearing support 140 and between centrifugal force bearing 138 and blade anchor 130 at bearing support 136 are permanent and may be made by vulcanizing the elastomeric material of centrifugal force bearing 138 directly on these surfaces or by bonded, adhered or otherwise secured the elastomeric material in a non-removable manner to these surfaces. As such, the spherical surfaces of bearing support 136 and bearing support 140 along with centrifugal force bearing 138 may be considered a single mechanical element. Centrifugal force bearing 138 may include a plurality of rigid shims disposed between layers of the elastomeric material. The durometer and thickness of the materials as well as the stiffness and/or spring rate of centrifugal force bearing 138 may be tailored to achieve the desired operational modes based upon the loads and motions expected in the particular application. In operation, centrifugal force bearing 138 is operable to provide a centrifugal force retention load path from a proprotor blade 104 to hub 102 via loop yoke 120 and pin 124. More specifically, loop yoke 120 includes a flapping bearing receiving region 144 and centrifugal force bearing receiving region 146 that transfer centrifugal force from a proprotor blade 104 to hub 102.

Figure 2A:
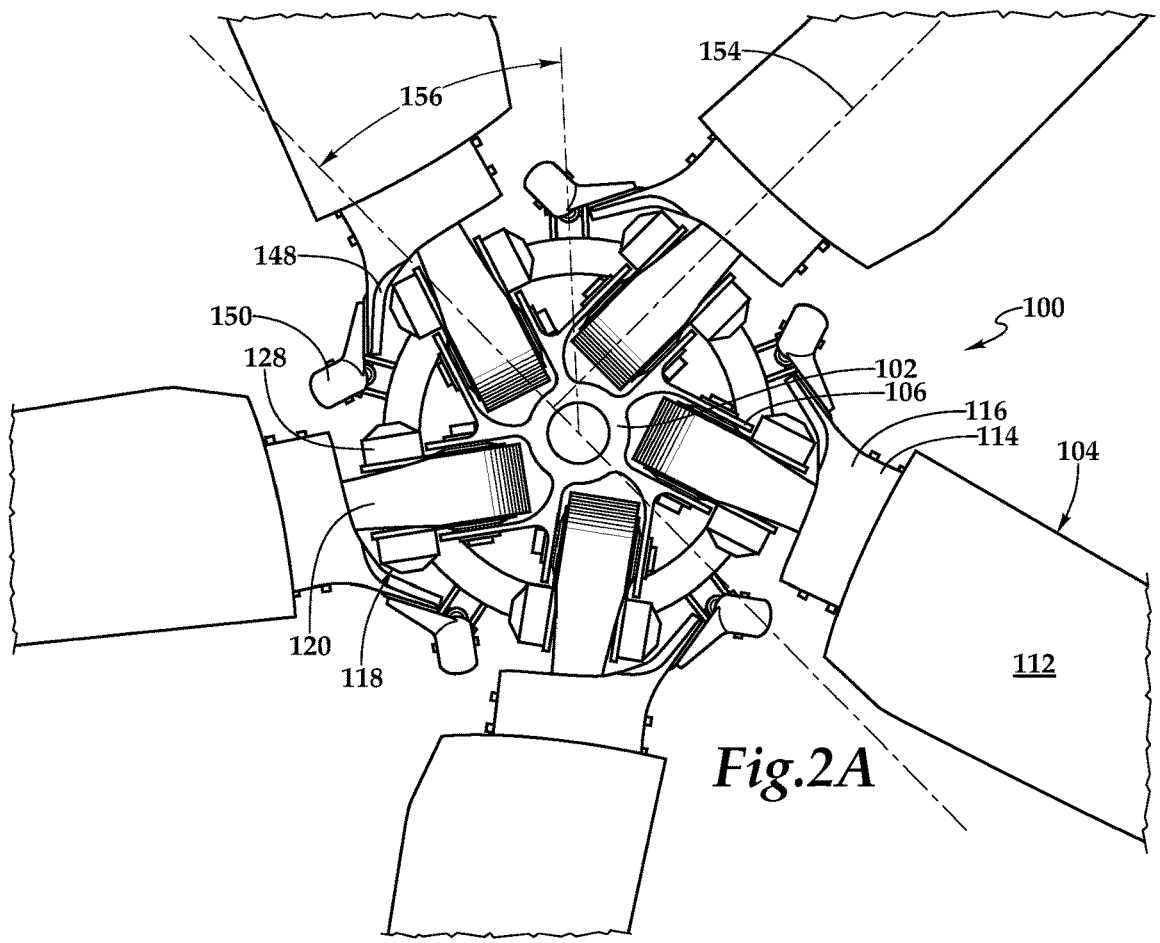
FIGS. 2A-2B are top views of a proprotor system for use on a tiltrotor aircraft in accordance with embodiments of the present disclosure.
Figure 2B:
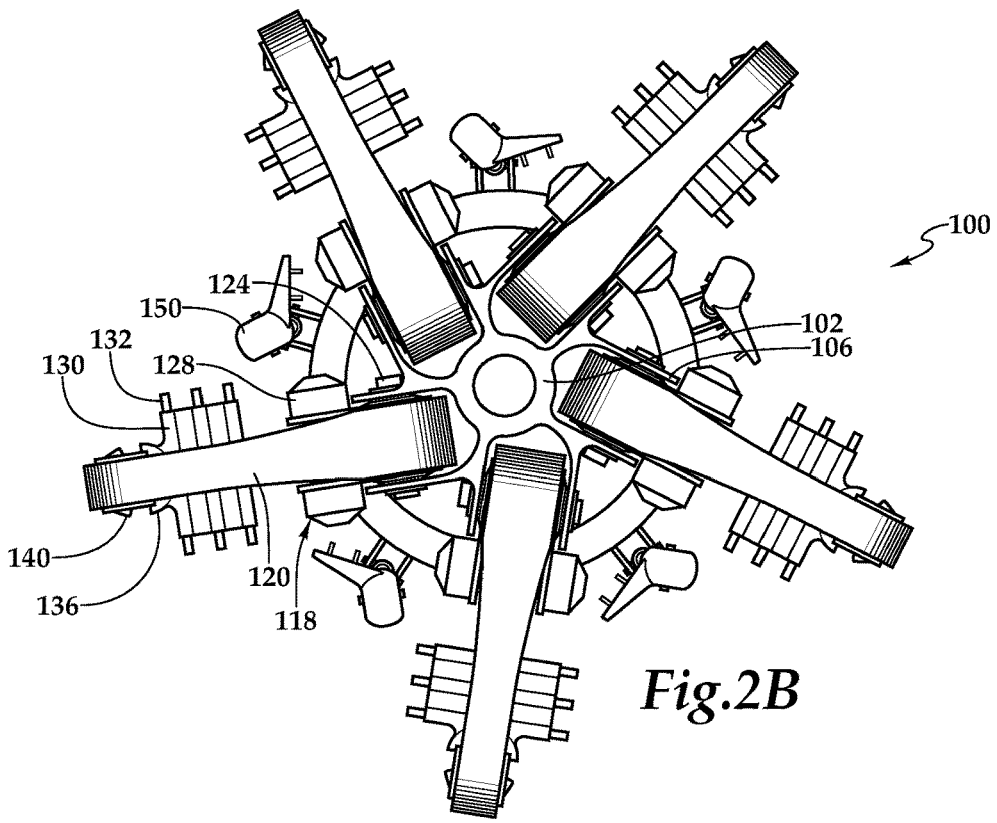
Figure 2C:
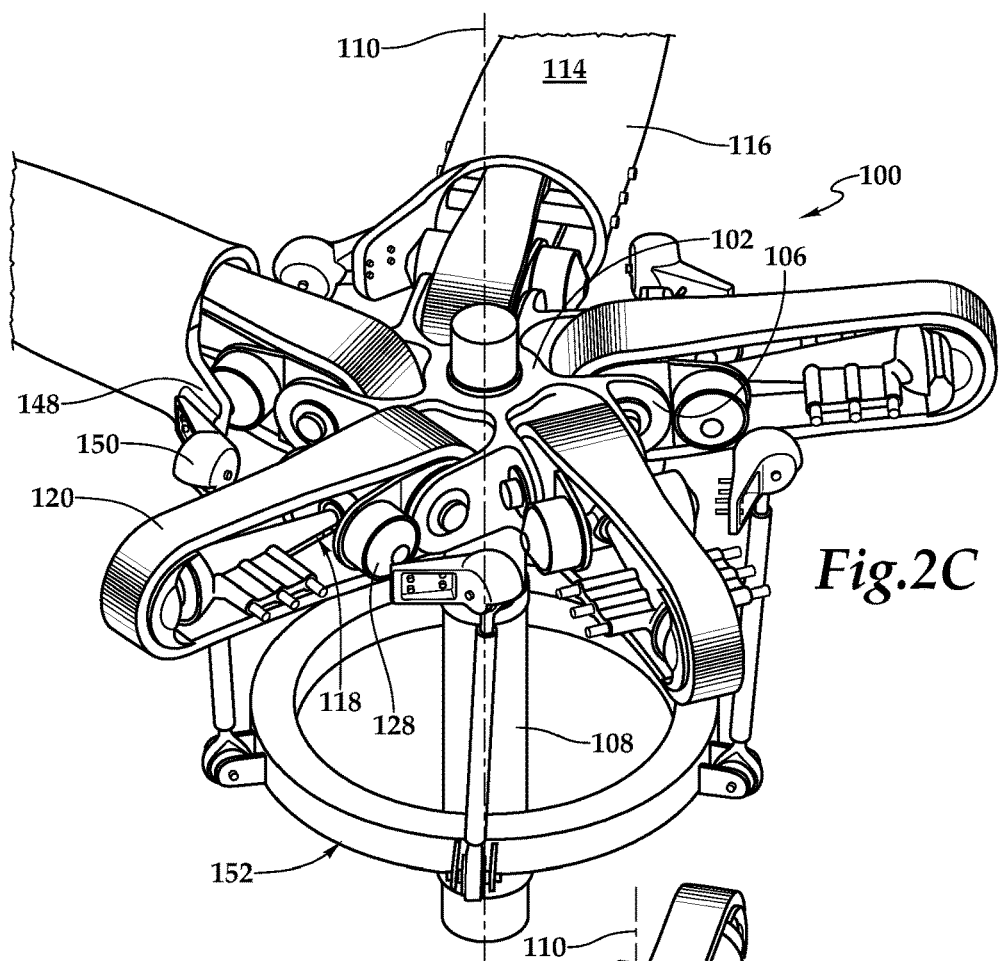
FIGS. 2C-2D are isometric views of a proprotor system for use on a tiltrotor aircraft in accordance with embodiments of the present disclosure.
Figure 2D:
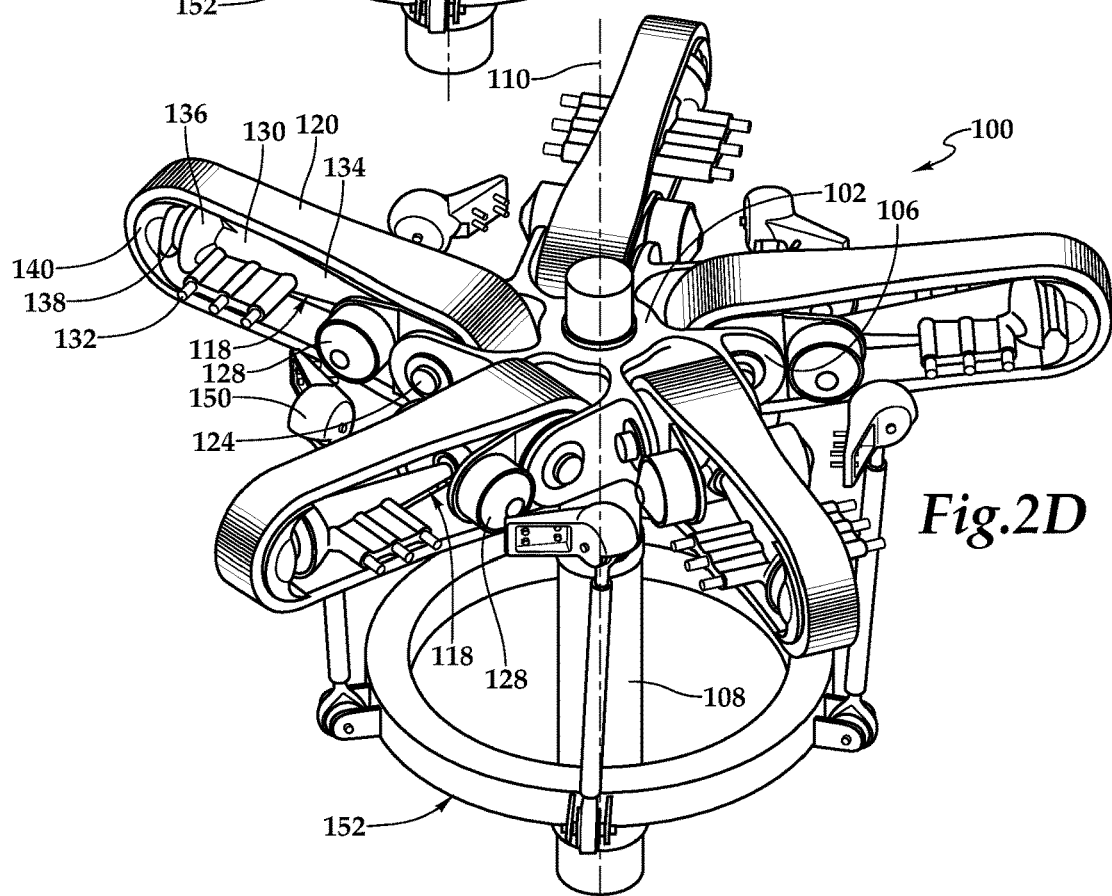

As illustrated, each spar 114 is coupled to a respective bearing assembly 118 by pins 132 of blade anchor 130. Thus, each spar 114 has a centrifugal force retention load path through integral cuff 116 via bearing assembly 118 and loop yoke 120 to hub 102. As noted, each proprotor blade 104 is operable to independently pivot or flap relative to hub 102 about its respective flapping axis 126. In the illustrated embodiment, each spar 114 includes an integral pitch horn 148 that is coupled to a pitch link 150 of a pitch control assembly 152 depicted as the rotating portion of a rise and fall swash plate operable to collectively and cyclically control the pitch of proprotor blades 104. Each proprotor blade 104 is operable to independently rotate about its pitch change axis 154 relative to hub 102, thereby changing pitch responsive to changes in position of the respective pitch link 150. Rotation of each proprotor blade 104 causes the respective blade anchor 130 to rotate relative to the lead-lag damper 128. As best seen in FIG. 2A, angle 156 represents the positive delta 3 configuration of the present embodiment, wherein the delta 3 angle is about positive 35 degrees. Implementing the illustrated positive delta 3 configuration enables the five blade design of proprotor system 100 while avoiding interference between pitch links 150 and other components of proprotor system 100.

Figure 4A:
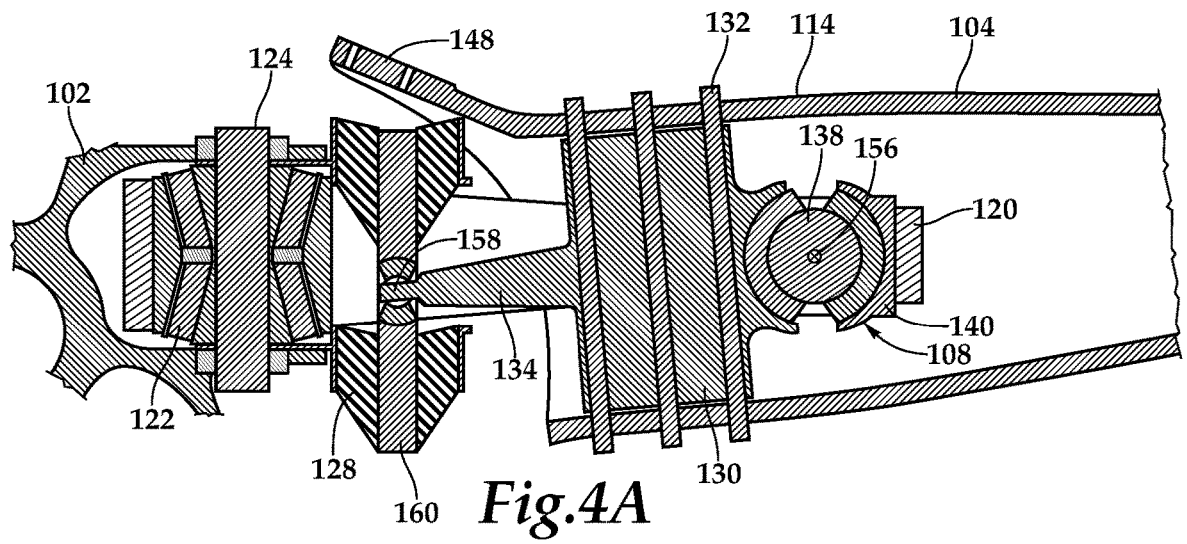
FIGS. 4A-4C are cross sectional views depicting an elastomeric damper during in-plane oscillation of a proprotor blade of a proprotor system for use on a tiltrotor aircraft in accordance with embodiments of the present disclosure.
Figure 4B:
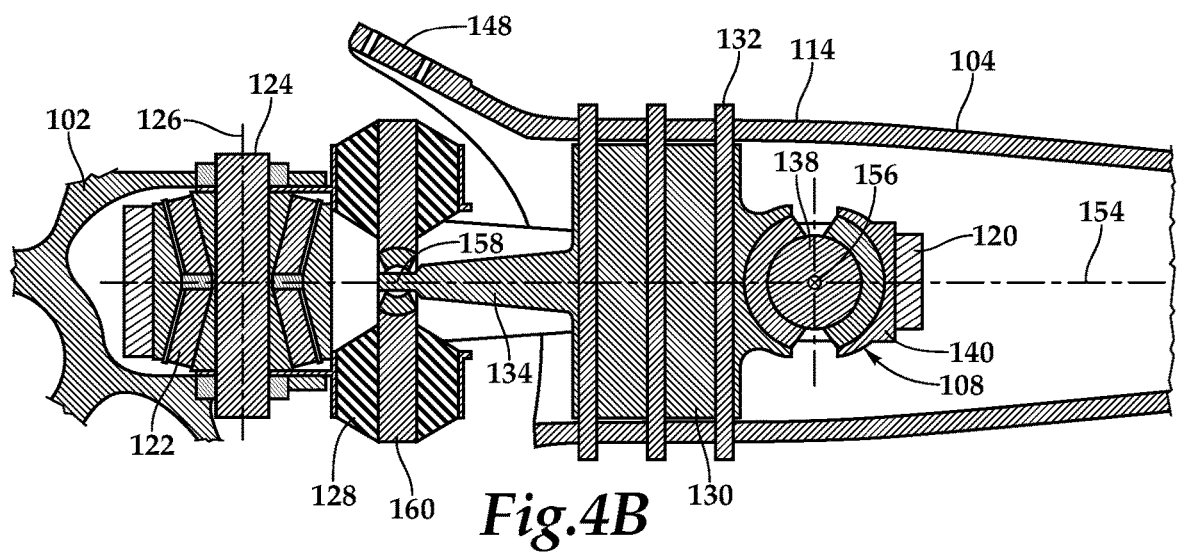
Figure 4C:
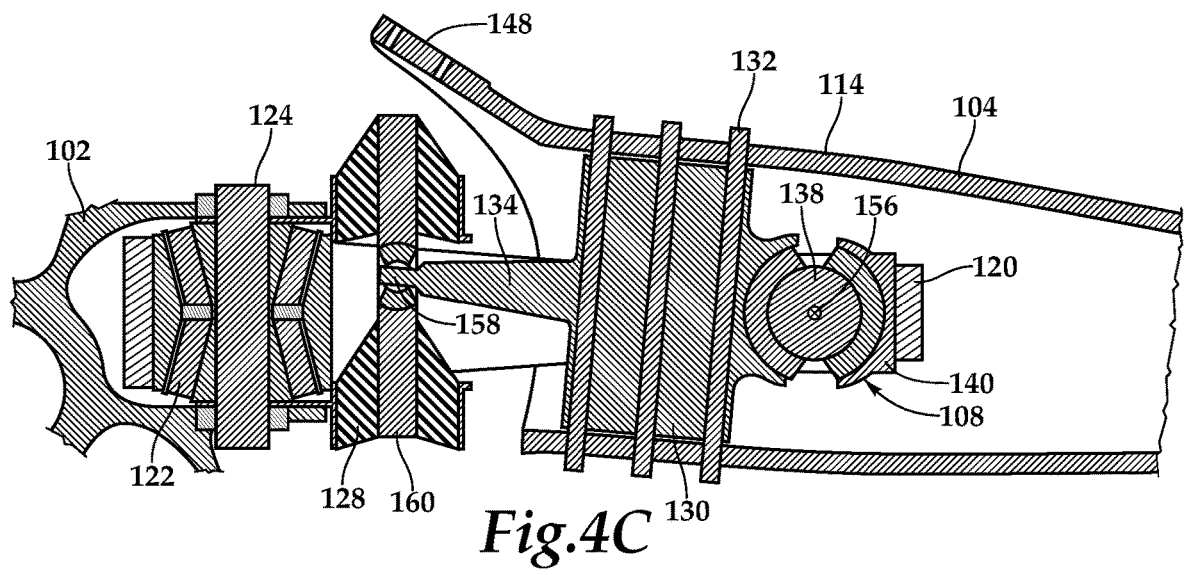

Referring next to FIGS. 4A-4C in the drawings, the operation of an elastomeric lead-lag damper is depicted during in-plane oscillation of a proprotor blade. In the illustrated embodiment, spar 114 of proprotor blade 104 is coupled to hub 102 by loop yoke 120 and bearing assembly 108 including flapping bearing 122, lead-lag damper 128, blade anchor 130 and centrifugal force bearing 138. During operation of a proprotor system, the proprotor blades may tend to oscillate forward (see lead position in FIG. 4A) and backwards (see lag position in FIG. 4C) relative to a neutral position (see FIG. 4B) as the proprotor system rotates as a result of conservation of momentum and acceleration/deceleration caused by the Coriolis effect. As illustrated, lead-lag damper 128 is an elastomeric damper having a spring rate operable to apply a damping force to prevent excess back and forth movement of proprotor blade 104 and to tune the first-in-plane lead-lag frequency a proprotor blade 104 to be below 1/rev through material selection, component sizing, component design and other factors known to those having ordinary skill in the art. For example, the first in-plane frequency of proprotor blade 104 may be between about 0.6/rev and about 0.9/rev. In this example, the first in-plane frequency of proprotor blade 104 in the helicopter mode of a tiltrotor aircraft may be between about 0.6/rev and about 0.7/rev and the first in-plane frequency of proprotor blade 104 in the airplane mode of a tiltrotor aircraft may be between about 0.8/rev and about 0.9/rev. Maintaining the first-in-plane frequency below 1.0/rev decouples the first-in-plane lead-lag frequency from the per revolution excitations frequencies and the out-of-plane flapping frequency.

In the illustrated embodiment, proprotor blade 104 has a virtual lead-lag hinge disposed within loop yoke 120 depicted as lead-lag axis 156, which is normal to pitch change axis 154, pointing out of the page, and coincident with a center point of centrifugal force bearing 138, as best seen in FIG. 4B. In other embodiments, it should be noted by those have ordinary skill in the art that the virtual lead-lag hinge could be inboard or outboard of the location of virtual lead-lag hinge 156. As best seen in FIG. 4A, when proprotor blade 104 moves forward in the lead position, proprotor blade 104 pivots about lead-lag axis 156 such that blade anchor extension 134 moves backwards causing spindle 158 of blade anchor 130 to shift piston 160 of lead-lag damper 128 backwards. The backwards movement of piston 160 is countered by the elastomer of lead-lag damper 128. Likewise, as best seen in FIG. 4C, when proprotor blade 104 moves backwards in the lag position, proprotor blade 104 pivots about lead-lag axis 156 such that blade anchor extension 134 moves forward causing spindle 158 of blade anchor 130 to shift piston 160 of lead-lag damper 128 forward. The forward movement of piston 160 is also countered by the elastomer of lead-lag damper 128. In this manner, lead-lag damper 128 applies a damping force to piston 160 and thus to proprotor blade 104 to prevent excess back and forth movement and to tune the first-in-plane lead-lag frequency of proprotor blade 104 to be below 1/rev.

Figure 5A:
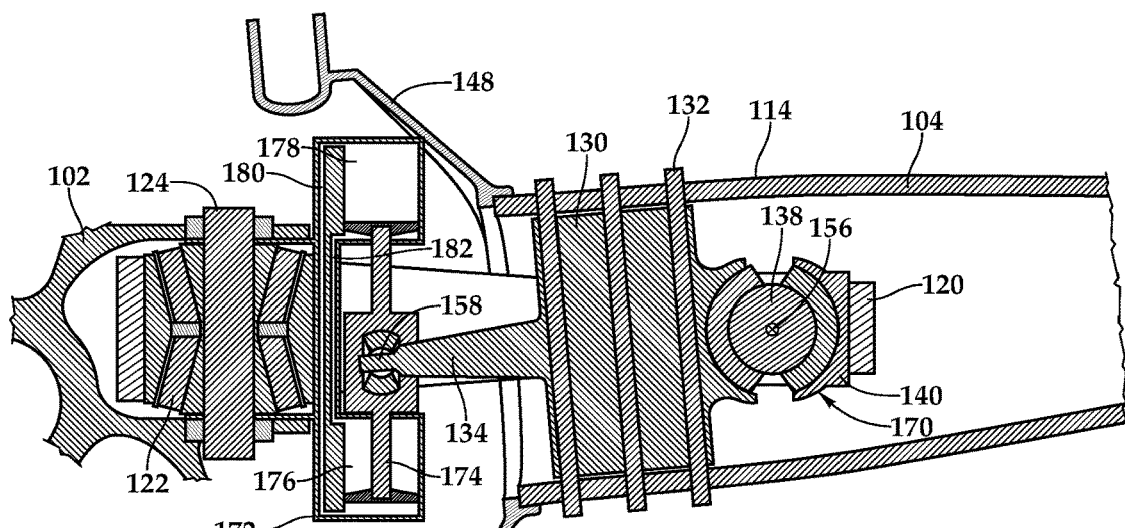
FIGS. 5A-5C are cross sectional views depicting a fluid damper during in-plane oscillation of a proprotor blade of a proprotor system for use on a tiltrotor aircraft in accordance with embodiments of the present disclosure.
Figure 5B:
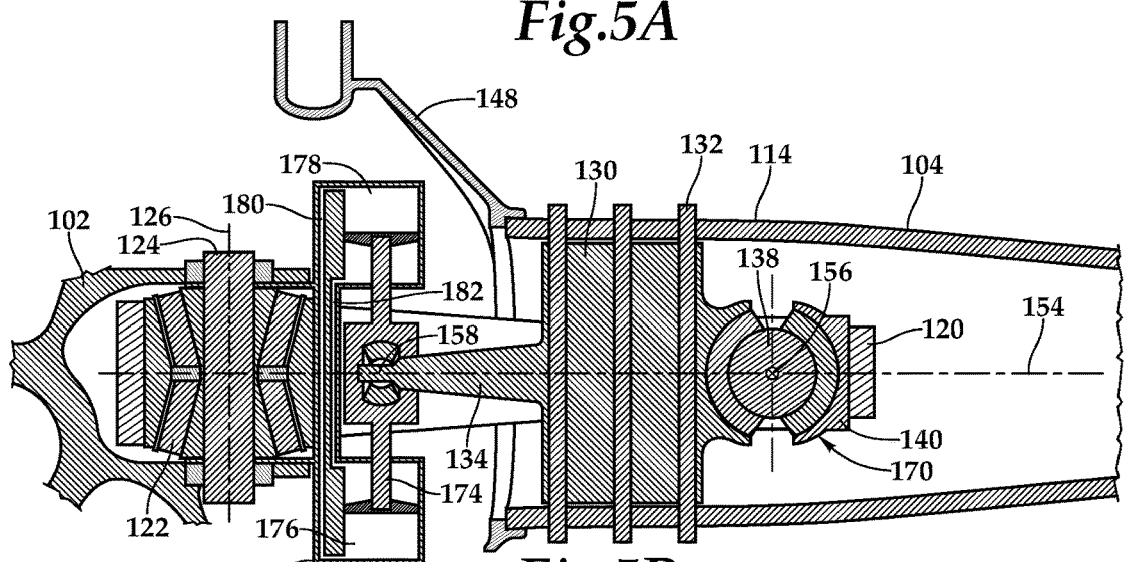
Figure 5C:
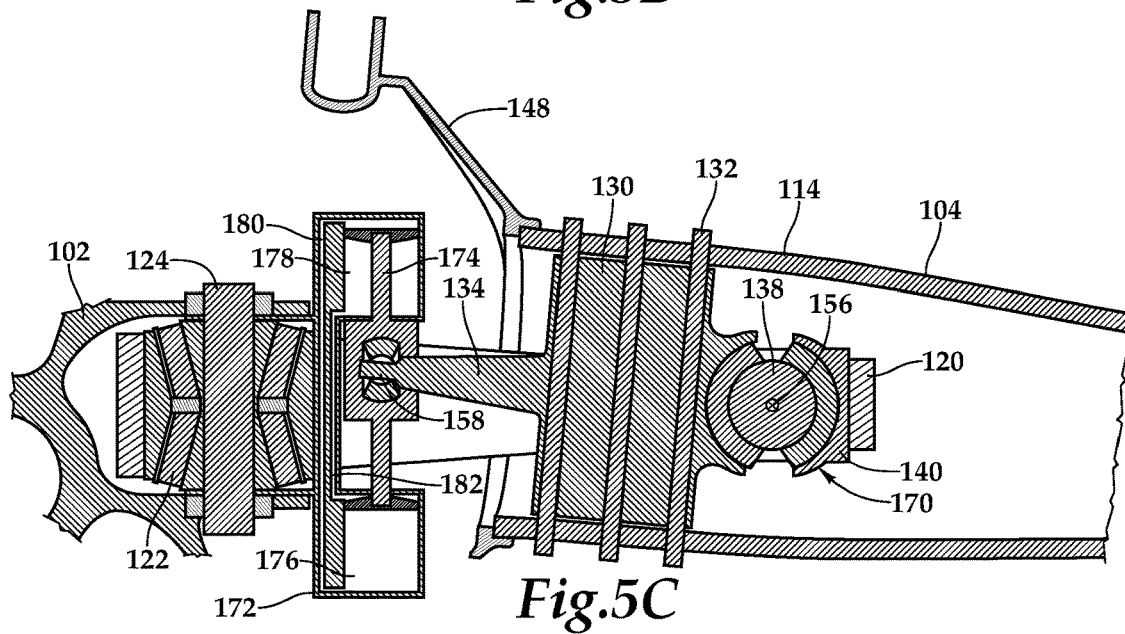

Referring next to FIGS. 5A-5C in the drawings, the operation of a fluid lead-lag damper is depicted during in-plane oscillation of a proprotor blade. In the illustrated embodiment, spar 114 of proprotor blade 104 is coupled to hub 102 by loop yoke 120 and bearing assembly 170 including flapping bearing 122, lead-lag damper 172, blade anchor 130 and centrifugal force bearing 138. During operation of a proprotor system, the proprotor blades may tend to oscillate forward (see lead position in FIG. 5A) and backwards (see lag position in FIG. 5C) relative to a neutral position (see FIG. 5B) as the proprotor system rotates as a result of conservation of momentum and acceleration/deceleration caused by the Coriolis effect. As illustrated, lead-lag damper 172 is a fluid damper having a spring rate operable to apply a damping force to prevent excess back and forth movement of proprotor blade 104 and to tune the first-in-plane lead-lag frequency a proprotor blade 104 to be below 1/rev through fluid selection, component sizing, component design and other factors known to those having ordinary skill in the art. For example, the first in-plane frequency of proprotor blade 104 may be between about 0.6/rev and about 0.9/rev. In this example, the first in-plane frequency of proprotor blade 104 in the helicopter mode of a tiltrotor aircraft may be between about 0.6/rev and about 0.7/rev and the first in-plane frequency of proprotor blade 104 in the airplane mode of a tiltrotor aircraft may be between about 0.8/rev and about 0.9/rev. Maintaining the first-in-plane frequency below 1.0/rev decouples the first-in-plane lead-lag frequency from the per revolution excitations frequencies and the out-of-plane flapping frequency.

In the illustrated embodiment, proprotor blade 104 has a virtual lead-lag hinge disposed within loop yoke 120 depicted as lead-lag axis 156, which is normal to pitch change axis 154, pointing out of the page, and coincident with a center point of centrifugal force bearing 138, as best seen in FIG. 5B. In other embodiments, it should be noted by those have ordinary skill in the art that the virtual lead-lag hinge could be inboard or outboard of the location of virtual lead-lag hinge 156. As best seen in FIG. 5A, when proprotor blade 104 moves forward in the lead position, proprotor blade 104 pivots about lead-lag axis 156 such that blade anchor extension 134 moves backwards causing spindle 158 of blade anchor 130 to shift piston 174 of lead-lag damper 172 backwards. The backwards movement of piston 174 is countered by fluid resistance as fluid transfers between chambers 176, 178 through passageways 180, 182. Likewise, as best seen in FIG. 5C, when proprotor blade 104 moves backwards in the lag position, proprotor blade 104 pivots about lead-lag axis 156 such that blade anchor extension 134 moves forward causing spindle 158 of blade anchor 130 to shift piston 174 of lead-lag damper 172 forward. The forward movement of piston 174 is countered by fluid resistance as fluid transfers between chambers 176, 178 through passageways 180, 182. In this manner, lead-lag damper 172 applies a damping force to piston 174 and thus to proprotor blade 104 to prevent excess back and forth movement and to tune the first-in-plane lead-lag frequency of proprotor blade 104 to be below 1/rev.

Figure 6A:
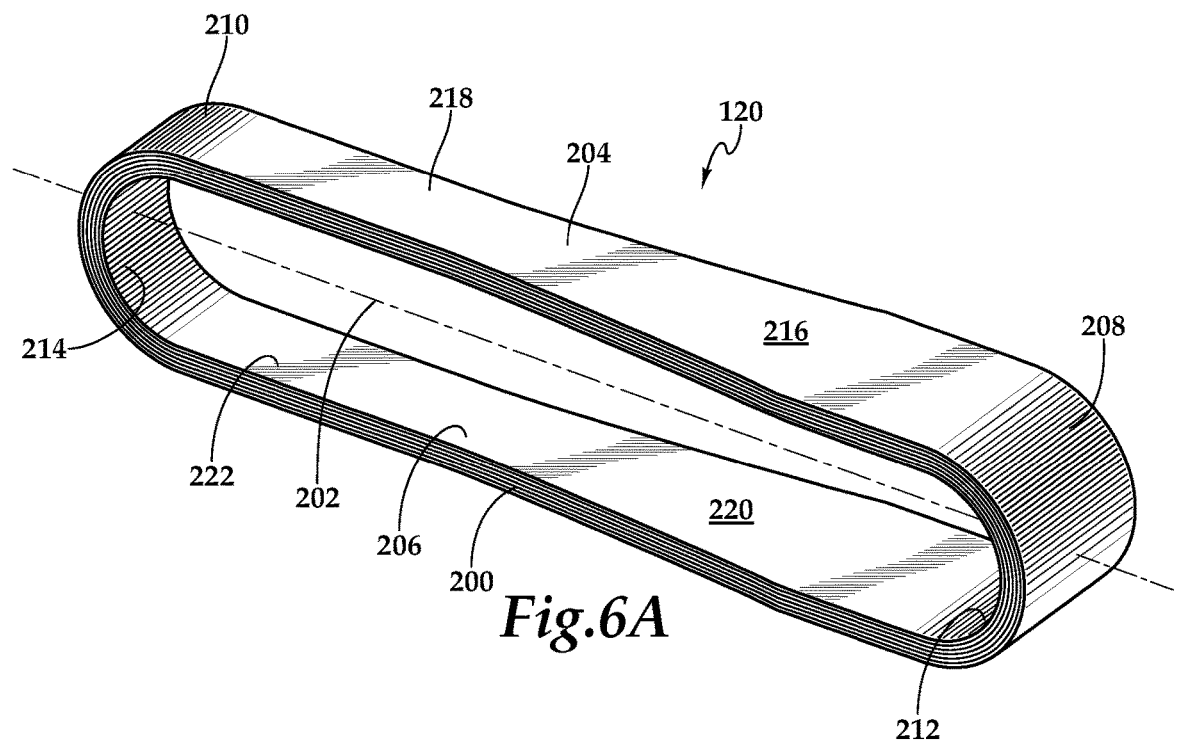
FIGS. 6A-6C are various views of a loop yoke of a proprotor system for use on a tiltrotor aircraft in accordance with embodiments of the present disclosure.
Figure 6B:
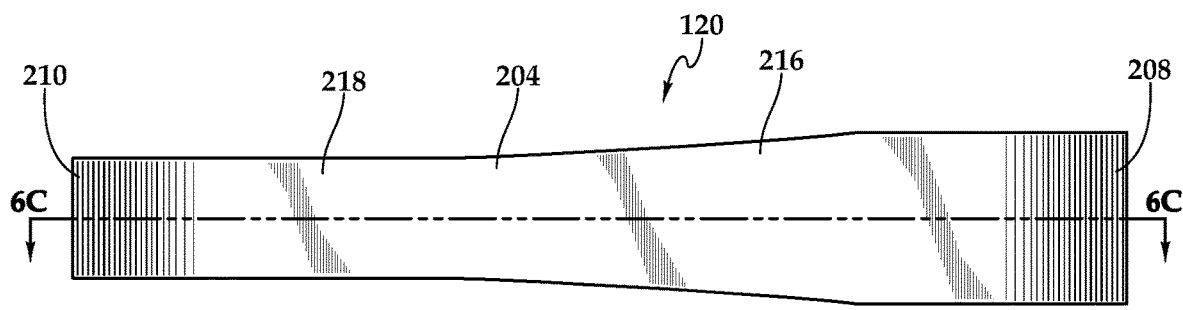
Figure 6C:
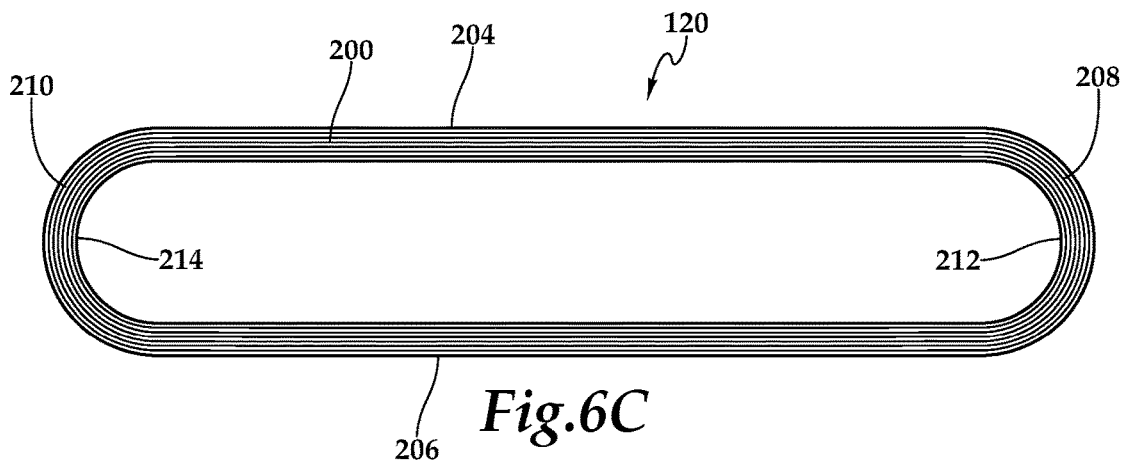

Referring next FIGS. 6A-6C of the drawings, various views of a loop yoke 120 are provided. As discussed herein, each loop yoke 120 provides a centrifugal force retention load path between a proprotor blade 104 and hub 102 of a proprotor system such as soft-in-plane proprotor system 100 operable for use on tiltrotor aircraft. In the illustrated embodiment, loop yoke 120 is a high-strength, lightweight, solid composite member having a profile in the form of a continuous loop 200, a best seen in the cross sectional view of FIG. 6C. As best seen in the perspective view of FIG. 6A, loop yoke 120 has a longitudinal axis 202. In the illustrated embodiment, continuous loop 200 includes an upper longitudinal section 204 and a lower longitudinal section 206. In addition, continuous loop 200 includes an inboard arcuate section 208 and an outboard arcuate section 210. Upper longitudinal section 204 and lower longitudinal section 206 respectively extend between inboard arcuate section 208 and outboard arcuate section 210 to form continuous loop 200.

Loop yoke 120 includes a flapping bearing receiving region 212 disposed at least partially within inboard arcuate section 208 to the interior of continuous loop 200. Loop yoke 120 also includes a centrifugal force bearing receiving region 214 disposed at least partially within outboard arcuate section 210 to the interior of continuous loop 200. In the illustrated embodiment, upper longitudinal section 204 and lower longitudinal section 206 are generally parallel to one another with upper longitudinal section 204 having a tapered section 216 and a generally constant width section 218 and lower longitudinal section 206 having a tapered section 220 and a generally constant width section 222 such that inboard arcuate section 208 has a greater width than outboard arcuate section 210. Even though a particular design for loop yoke 120 has been depicted and described, it should understood by those having ordinary skill in the art that yoke loops of the present disclosure could have alternate configurations including loop yokes having upper and lower longitudinal sections that are not parallel to one another, loop yokes having upper and lower longitudinal sections that are fully tapered, not tapered or have other contours and loop yokes having inboard and outboard arcuate sections having the same width, to name a few.

Figure 7A:
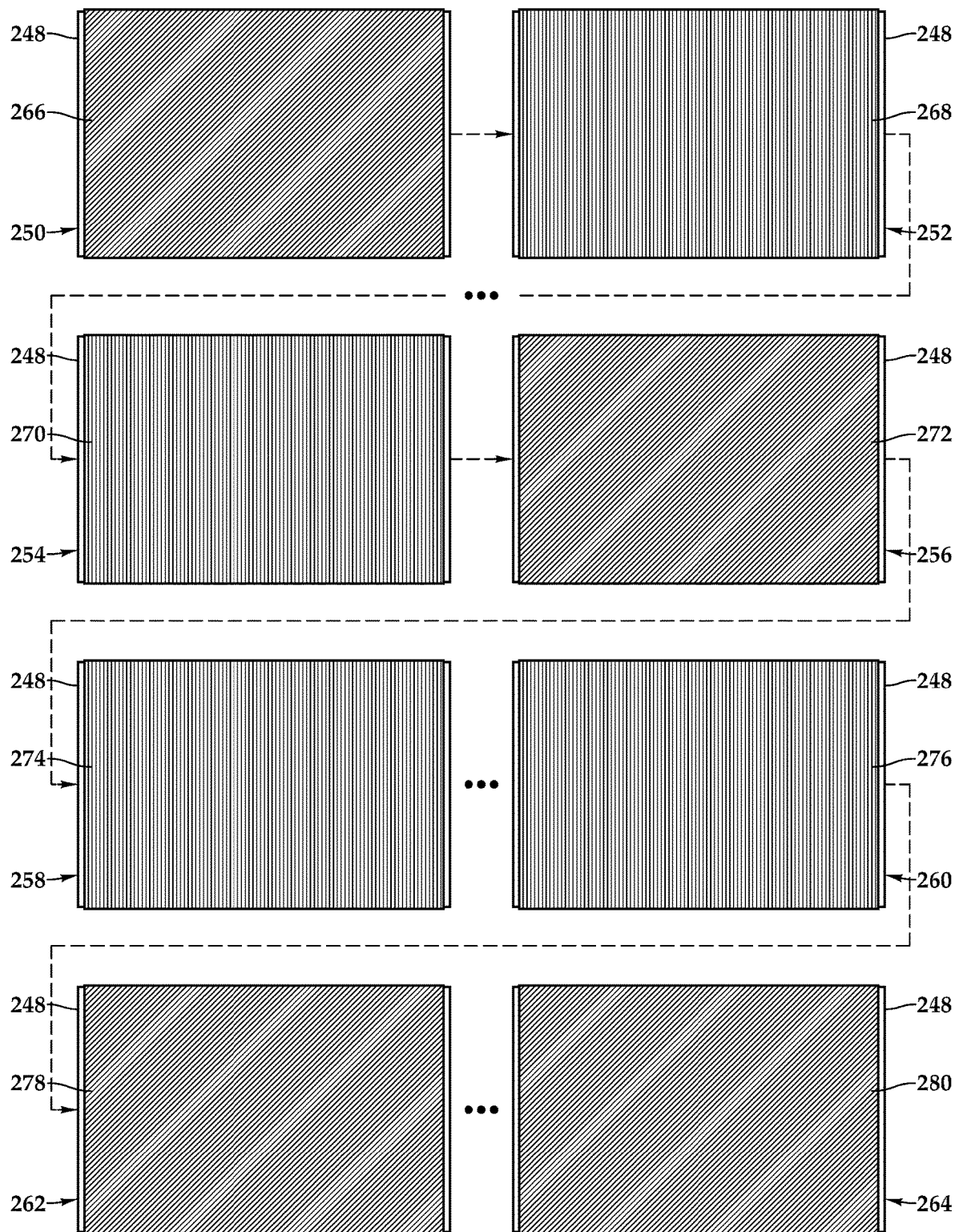
FIGS. 7A-7E show processing steps for forming loop yokes for a proprotor system for use on a tiltrotor aircraft in accordance with embodiments of the present disclosure.

Referring additionally to FIGS. 7A-7E of the drawings, therein is depicted a process of forming loop yokes of the present disclosure according to one example embodiment. FIG. 7A shows a layup process including steps 250-264 corresponding to the layup of variously plies of material. As indicated by the ellipses between various steps, the teachings herein recognize that many more plies would be used in an actual layup to achieved the desired wall thickness for the loop yokes of the present disclosure. For example, depending upon the material or materials forming the plies and the desired wall thickness of the loop yokes being formed, dozens or hundreds of plies may be used.

At step 250, a ply 266 of material has been wrapped around mandrel 248 for substantially one turn including allowance for overlapping and/or gapping between the ends of ply 266. Mandrel 248 has a smother outer surface corresponding to the desired shape of the interior of the loop yokes. In the illustrated embodiment, ply 266 is a double bias material ply such as a double bias material ply having plus and minus 45 degree orientation. It is noted that only the outer portion of the double bias material ply is visible in FIG. 7A, which is being represented by the plus 45 degree parallel lines depicting ply 266. As one example, ply 266 may be a double bias carbon fiber fabric with plus and minus 45 degree orientation having a thickness of between about 10 and 20 thousandth of an inch. It should be understood by those having ordinary skill in the art that the loop yokes of the present disclosure could be formed using other types of broad goods as the innermost ply including fabrics other than carbon fabrics, construction other than plus and minus 45 degree orientation and thicknesses both less than 10 thousandth of an inch and greater than 20 thousandth of an inch including, for example, broad goods having plain weaves, twill weaves or unidirectional construction and broad goods formed from fiberglass, to name a few.

At step 252, ply 268 has been wrapped around mandrel 248 to the exterior of ply 266 for substantially one turn. In the illustrated embodiment, ply 268 is a unidirectional material ply such as a unidirectional material ply with 0 degree orientation parallel to the longitudinal axis of the loop yoke, as represented by the 0 degree parallel lines depicting ply 268. As one example, ply 268 may be unidirectional carbon fiber fabric with 0 degree orientation having a thickness of between about 5 and 15 thousandth of an inch. It should be understood by those having ordinary skill in the art that the loop yokes of the present disclosure could be formed using other types of broad goods for the intermediate plies including fabrics other than carbon fabrics, construction other than 0 degree orientation and thicknesses both less than 5 thousandth of an inch and greater than 15 thousandth of an inch including, for example, broad goods having plain weaves or twill weaves and broad goods formed from fiberglass, to name a few.

Preferably, the same broad goods material may be wrapped around mandrel 248 more than one time during certain stages of the layup process. For example, at step 254, ply 270 has been wrapped around mandrel 248 to the exterior of ply 268 for substantially one turn. In this configuration, two plies of the unidirectional material have been wrapped over one ply of the double bias material, which would result in a ratio of unidirectional material plies to the double bias material plies of about 2 to 1. As stated above, the ellipsis between step 252 and step 254 represents additional turns of the broad goods material being wrapped around mandrel 248. For example, the unidirectional material may be wrapped around mandrel 248 any number of times depending upon the desired component properties. For example, the unidirectional material may be wrapped around mandrel 248 one, two, three, four or more additional turns. In a preferred arrangement, the ratio of the unidirectional material plies to the double bias material plies is between about 2 to 1 and about 6 to 1. In another preferred arrangement, the ratio of the unidirectional material plies to the double bias material plies is between about 3 to 1 and about 5 to 1. In a further preferred arrangement, the ratio of the unidirectional material plies to the double bias material plies is about 4 to 1. It is noted that orienting the unidirectional material plies with 0 degree orientation parallel to the longitudinal axis of the loop yokes provides the greatest strength in the direction of the primary load carried by the loop yokes; namely, the centrifugal force load path supported by the loop yokes.

Continuing with the layup process, at step 256, ply 272 has been wrapped around mandrel 248 to the exterior of ply 270 for substantially one turn. In the illustrated embodiment, ply 272 is a double bias material ply such as a double bias carbon fiber fabric having plus and minus 45 degree orientation. At step 258, ply 274 has been wrapped around mandrel 248 to the exterior of ply 272 for substantially one turn. In the illustrated embodiment, ply 274 is a unidirectional material ply such as a unidirectional carbon fiber fabric with 0 degree orientation parallel to the longitudinal axis of the loop yoke. Likewise, at step 260, ply 276 has been wrapped around mandrel 248 to the exterior of ply 274 for substantially one turn. In the illustrated embodiment, ply 276 is a unidirectional material ply such as a unidirectional carbon fiber fabric with 0 degree orientation parallel to the longitudinal axis of the loop yoke. As stated above, the ellipsis between step 258 and step 260 represent any number of additional turns of the broad goods material being wrapped around mandrel 248. At step 262, ply 278 has been wrapped around mandrel 248 to the exterior of ply 276 for substantially one turn. In the illustrated embodiment, ply 276 is a double bias material ply such as a double bias carbon fiber fabric having plus and minus 45 degree orientation. It is noted that having a double bias material ply interposed between multiple unidirectional material plies improves the performance of the loop yokes by preventing any crack that may develop within one group of unidirectional material plies from propagating to another group of unidirectional material plies.

The layup process continues by sequencing between laying up a plurality of unidirectional material plies then laying up a double bias material ply until the desired thickness for the loop yokes is achieved, as represented by the ellipsis between step 262 and step 264. At step 264, ply 280 has been wrapped around mandrel 248 to form the outermost material ply. In the illustrated embodiment, ply 280 is a double bias material ply such as a double bias carbon fiber fabric having plus and minus 45 degree orientation. It is noted that the ratio of a first type of material plies, such as unidirectional material plies, to a second type of material plies, such as double bias material plies, need not stay constant for the entire thickness of the loop yokes. For example, in certain implementations, it may be desirable to have one ratio of the first type of material plies to the second type of material plies, such as between about 2 to 1 and about 3 to 1, in the inner and/or outer portions of the loop yoke but have a second ratio of the first type of material plies to the second type of material plies, such as between about 4 to 1 and about 6 to 1, in the center sections of the loop yoke. Having nonuniform ratios of the first type of material plies to the second type of material plies enables tailoring of desired properties of the loop yoke. Also, even though the double bias material plies have been described as being prefabricated as a single fabric, it should be understood by those having ordinary skill in the art that the double bias material plies could alternatively be formed during lay up by, for example, wrapping a unidirectional material ply such as a unidirectional carbon fiber fabric with plus 45 degree orientation to the exterior of a unidirectional material ply such as a unidirectional carbon fiber fabric with minus 45 degree orientation. In addition, even though the double bias material plies have been described as being plus and minus 45 degrees, it should be understood by those having ordinary skill in the art that the double bias material plies could alternatively have other orientations such as plus and minus 30 degrees, plus and minus 60 degrees, plus 30 degrees and minus 60 degrees or other suitable orientation depending upon the desired properties for the loop yokes.

Figure 7C:
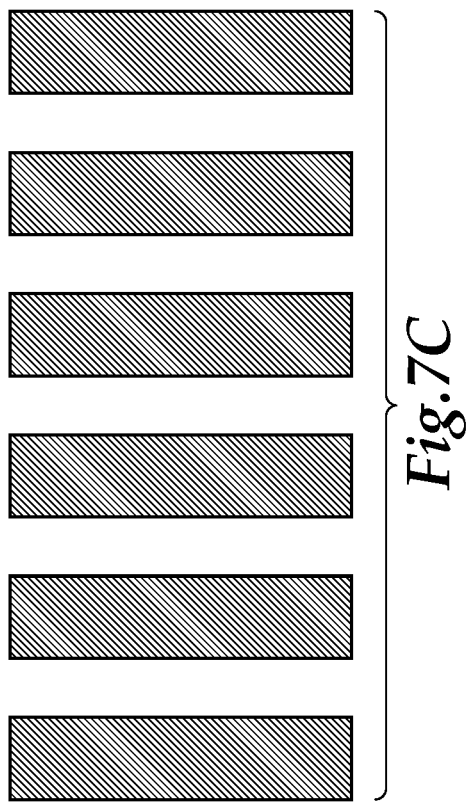
Figure 7E:
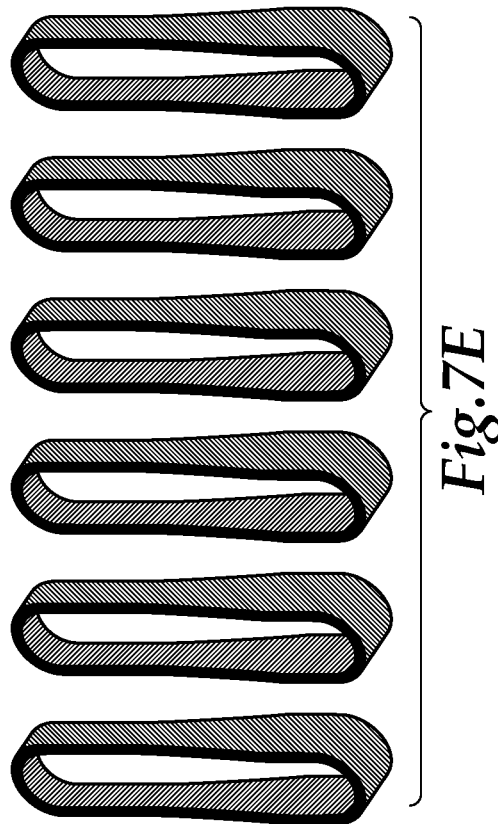
Figure 7B:
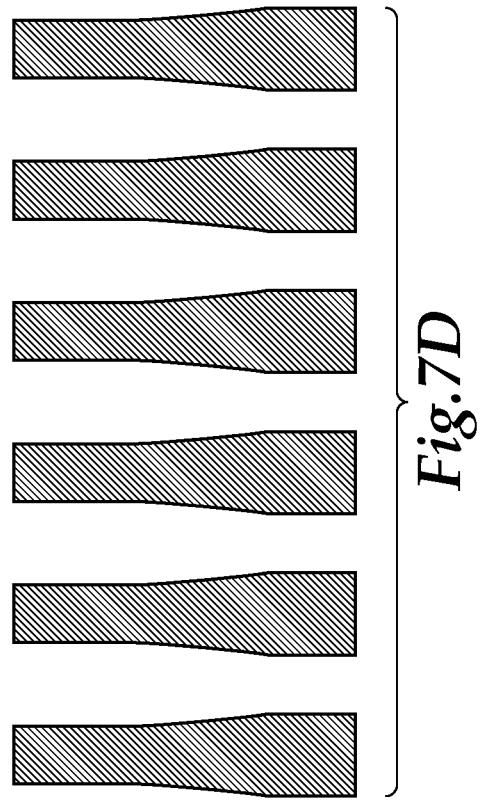
Figure 7D:
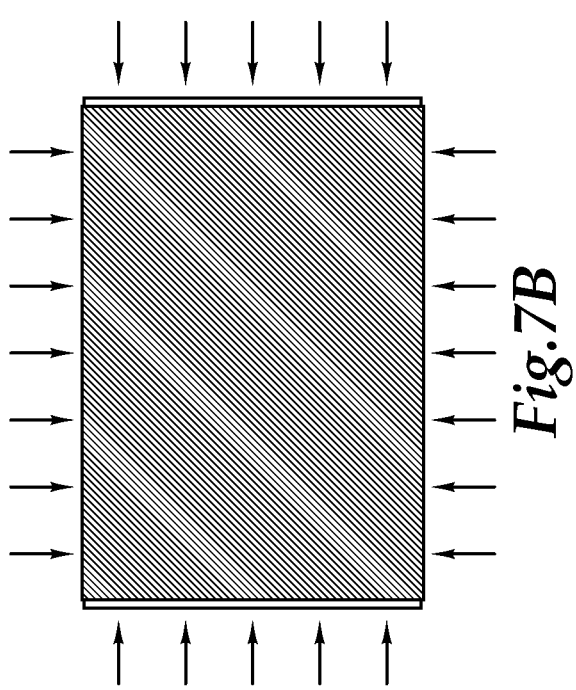

The layup process for the loop yokes of the present disclosure may be a manual process or an automated process. The material plies may be laid up with a fluid resin such as an epoxy resin. The combination of the material plies and resin, supported by mandrel 248, may be cured using, for example, an autoclave curing process, as indicated by the heat arrows in FIG. 7B. In the illustrated embodiment, the curing process yields a composite structure in the form a cured yoke assembly. Preferably, the cured yoke assembly is cut into a plurality of yoke members as depicted in FIG. 7C. The yoke members are then trimmed using a suitable machining or other removal process to form the yoke members into the desired shape of the loop yokes of the present disclosure as depicted in FIG. 7D. Various additional finishing steps may then be performed to produced the loop yokes of the present disclosure as depicted in FIG. 7E. Through the use of the broad goods manufacturing process and using carbon fiber fabric as the primary structural material, the loop yokes of the present disclosure are high-strength, lightweight, solid composite members operable to provides a centrifugal force retention load path between proprotor blades 104 and hub 102 of a proprotor system such as soft-in-plane proprotor system 100 operable for use on tiltrotor aircraft. In addition, the loop yokes of the present disclosure have suitable fatigue durability for their intended purpose.

Referring next to FIGS. 8A-8D in the drawings, a soft-in-plane proprotor system for tiltrotor aircraft is depicted and generally designated 300. In the illustrated embodiment, proprotor system 300 includes a hub 302 having five proprotor blades 304 coupled thereto at respective grip members depicted as devises 306 of hub 302. Hub 302 is attached to and rotates with mast 308, which is coupled to a drive system including an engine and transmission of the tiltrotor aircraft that provides torque and rotational energy to proprotor system 300 to enable rotation about rotational axis 310. In the illustrated embodiment, each proprotor blade 304 includes an outer skin 312 having a spar 314 that extends spanwise toward the tip thereof. Spars 314 are preferably the main structural member of proprotor blades 304 designed to carry the primary centrifugal and bending loads of proprotor blades 304. Proprotor blades 304 may have a root-to-tip twist on the order of about 20 degrees to about 40 degrees or other suitable root-to-tip twist.

Each spar 314 has a root section depicted as integral cuff 316 to enable coupling of each proprotor blade 304 with a respective blade support assembly 318. As best seen in FIG. 9, each blade support assembly 318 includes a flapping bearing 322 coupled to a clevis 306 of hub 302 by a connecting member depicted as pin 324. As illustrated, flapping bearing 322 is a twin conical elastomeric flapping bearing operable to allow a proprotor blade 304 to rotate or have a flapping degree of freedom relative to hub 302 about a flapping axis 326 that passes through pin 324. Flapping bearing 322 may be formed from one or more elastomeric members or layers and may include rigid shims disposed between elastomeric layers. The durometer and thickness of the materials as well as the stiffness of flapping bearing 322 may be tailored to achieve the desired operational modes based upon the loads and motions expected in the particular application.

Each blade support assembly 318 also includes a lead-lag damper 328 coupled to a clevis 306 of hub 302 by pin 324. As illustrated, lead-lag damper 328 is an elastomeric damper having a spring rate operable to apply a damping force to the lead-lag degree of freedom of a proprotor blade 304 and to tune the first-in-plane lead-lag frequency of in-plane oscillation of a proprotor blade 304. Lead-lag damper 328 may include a plurality of rigid shims disposed between layers of the elastomeric material. The durometer and thickness of the materials as well as the softness and/or a spring rate of lead-lag damper 328 may be tailored to achieve the desired operational modes based upon the loads and motions expected in the particular application.

In addition, each blade support assembly 318 includes a blade anchor 330 that has a plurality of pins 332 for connection to a spar 314 of a proprotor blade 304. In the illustrated embodiment, the in-plane oscillation of a proprotor blade 304 is coupled to lead-lag damper 328 by blade anchor 330 via blade anchor extension 334 that is coupled to lead-lag damper 328. The connection between blade anchor 330 and proprotor blade 304 is at an inboard station of proprotor blade 304.

Each blade support assembly 318 further includes a twist shank 338 that is operable to provide a centrifugal force retention load path from a proprotor blade 304 to hub 302 via yoke 320 and pin 324. More specifically, yoke 320 includes a flapping bearing receiving region 344 and grips 346 that couple to an inboard end 372 of twist shank 338 via connecting members depicted as pins 360. In the illustrated embodiment, upper and lower spacers 362, 364 are disposed between yoke 320 and twist shank 338. The outboard end 376 of twist shank 338 is coupled to proprotor blade 304 via connecting members depicted as pins 366. The connection between twist shank 338 and proprotor blade 304 is at an outboard station of proprotor blade 304. Preferably, twist shank 338 is stiff in the spanwise direction but flexible in the in-plain and torsional degrees of freedom.

Figure 10A:
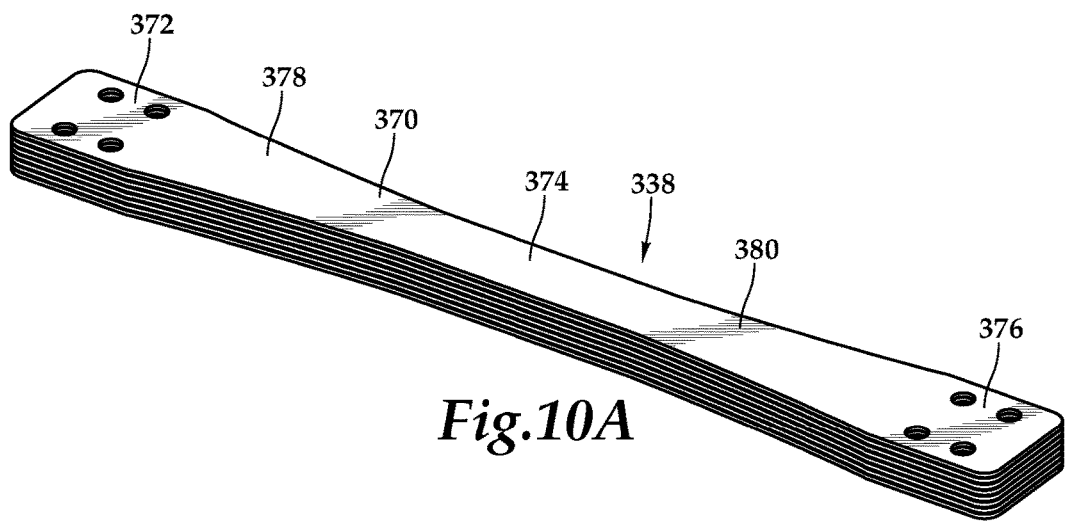
FIGS. 10A-10C are various views of a twist shank of a proprotor system for use on a tiltrotor aircraft in accordance with embodiments of the present disclosure.
Figure 10B:
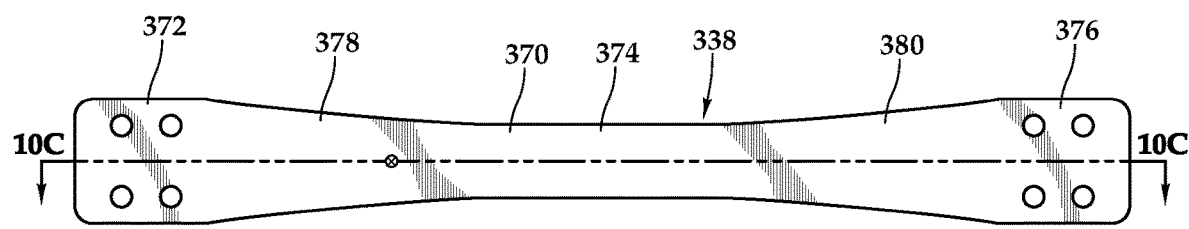
Figure 10C:
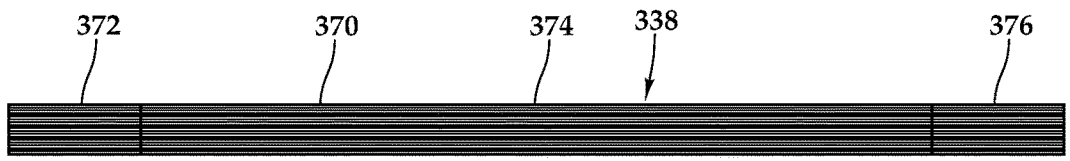

As best seen in FIGS. 10A-10C, twist shank 338 is formed from a plurality of material layers such as alternating high strength layers having resilient layers interposed therebetween. For example, the high strength layers may be formed from fiberglass or carbon while the resilient layers may be formed from rubber or other elastomer or polymer. Depending upon the desired modes of operations for twist shank 338, the number of high strength layers may be between three and fifteen or more layers. In some implementations, the material layers of twist shank 338 may be cured, bonded or otherwise adhered together, in which case, bending and torsional stress applied to twist shank 338 results in shear deformation of the resilient layers. In other implementations, some or all of the material layers along all or a portion of twist shank 338 may be free to move relative to each other to allow for bending and torsion of twist shank 338. In either case, twist shank 338 preferably has an in-plane spring rate operable to assist lead-lag damper 328 in applying a damping force to the lead-lag degree of freedom of a proprotor blade 304 and to tune the first-in-plane lead-lag frequency of in-plane oscillation of a proprotor blade 304.

As illustrated, twist shank 338 is in the form of a beam 370 having a rectangular cross section (as seen in FIG. 10C), an inboard end 372, a central section 374 and an outboard end 376. Twist shank 338 has a tapered section 378 between inboard end 372 and central section 374. In addition, twist shank 338 has a tapered section 380 between outboard end 376 and central section 374. Preferably, the design and materials of twist shank 338 enable the attached proprotor blade 304 to rotate about its pitch change axis 354 through a collective range between about plus 50 degrees and about minus 50 degrees with inboard end 372 remaining fixed while outboard end 376 rotates relative thereto with proprotor blade 304. Twist shank 338 may have a pre-twist in its resting state in certain implementations. For example, twist shank 338 may have between about plus or minus 5 degrees to 20 degrees of pre-twist.

Figure 8A:
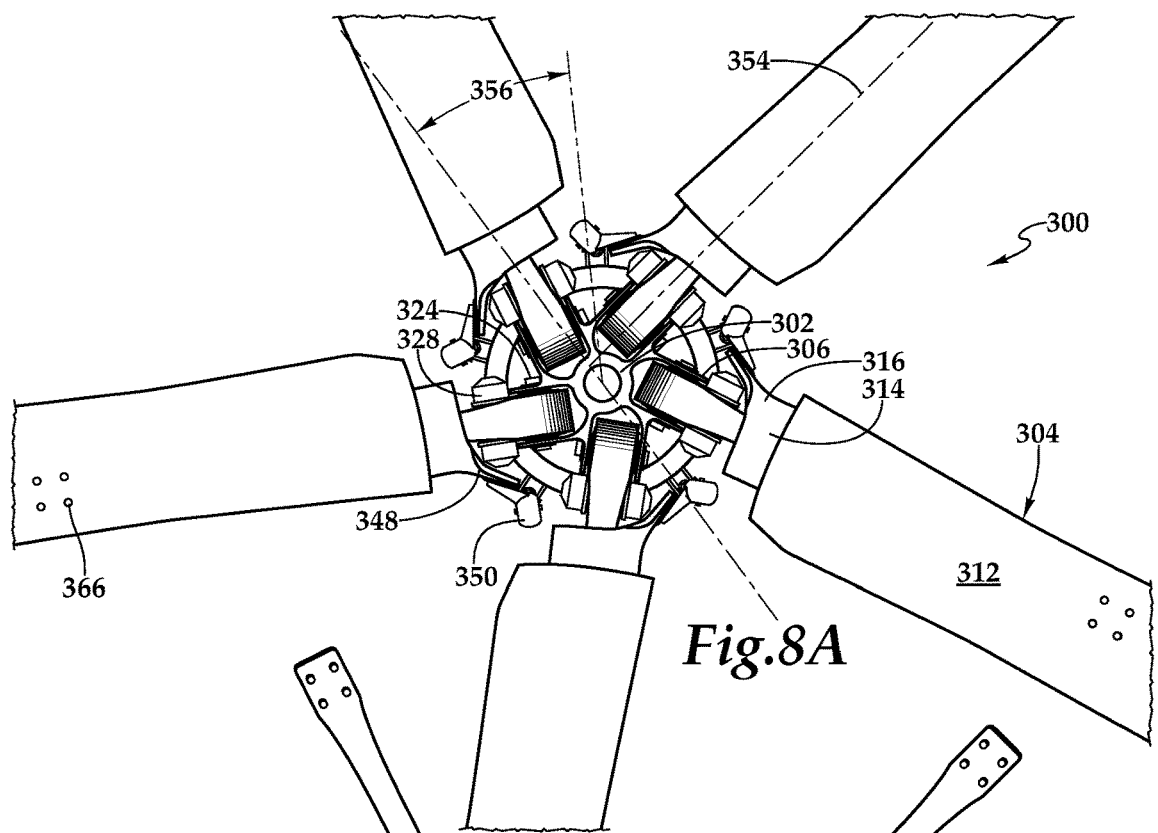
FIGS. 8A-8B are top views of a proprotor system for use on a tiltrotor aircraft in accordance with embodiments of the present disclosure.
Figure 8B:
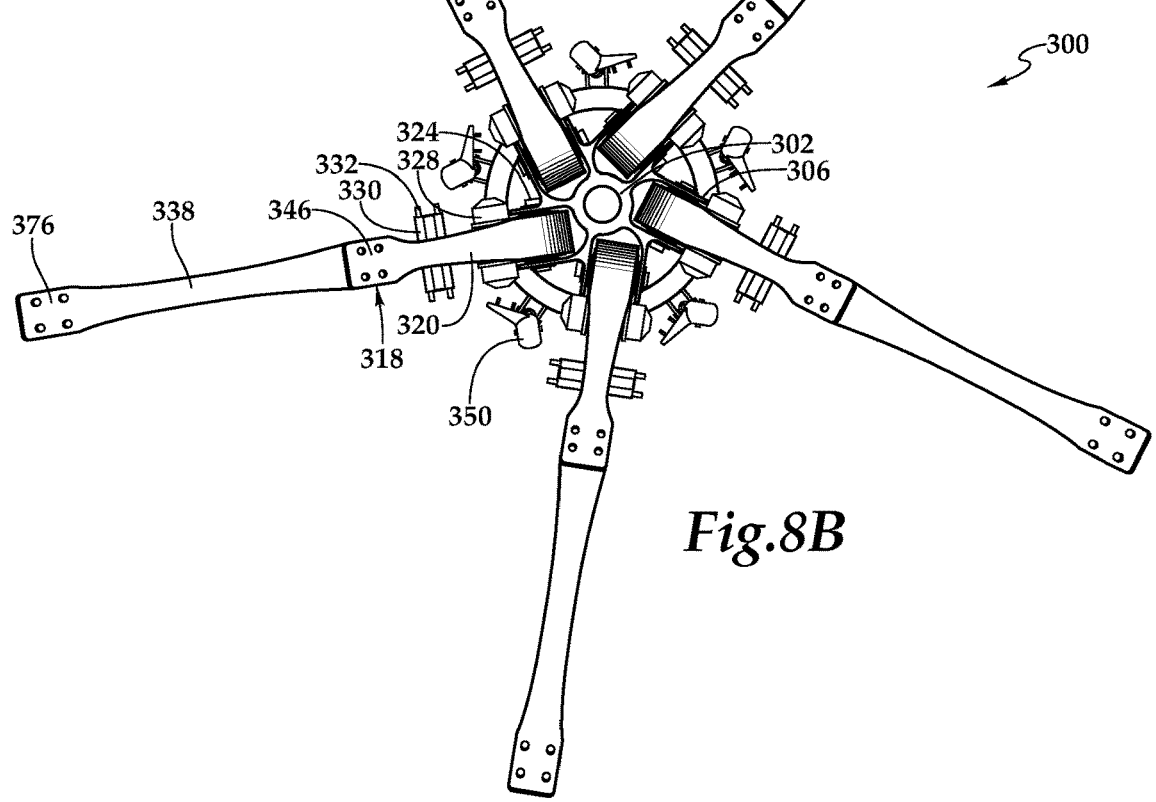
Figure 8C:
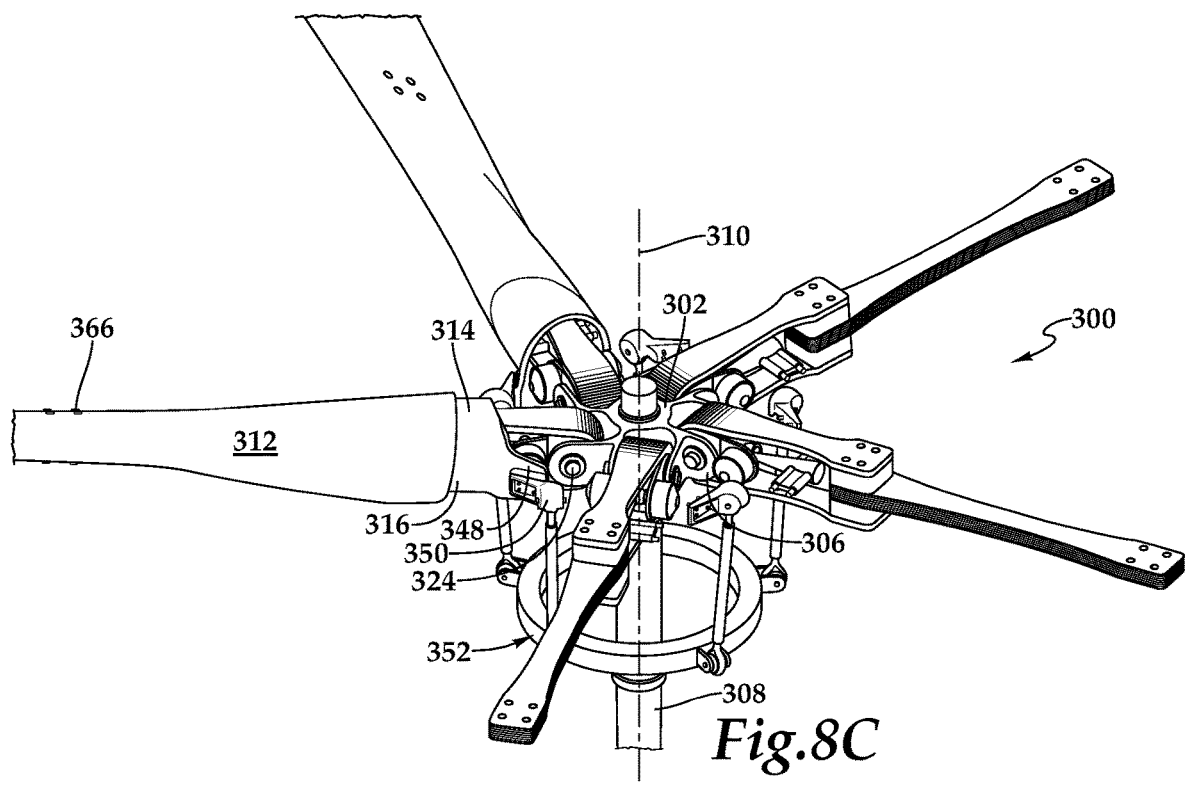
FIGS. 8C-8D are isometric views of a proprotor system for use on a tiltrotor aircraft in accordance with embodiments of the present disclosure.
Figure 8D:
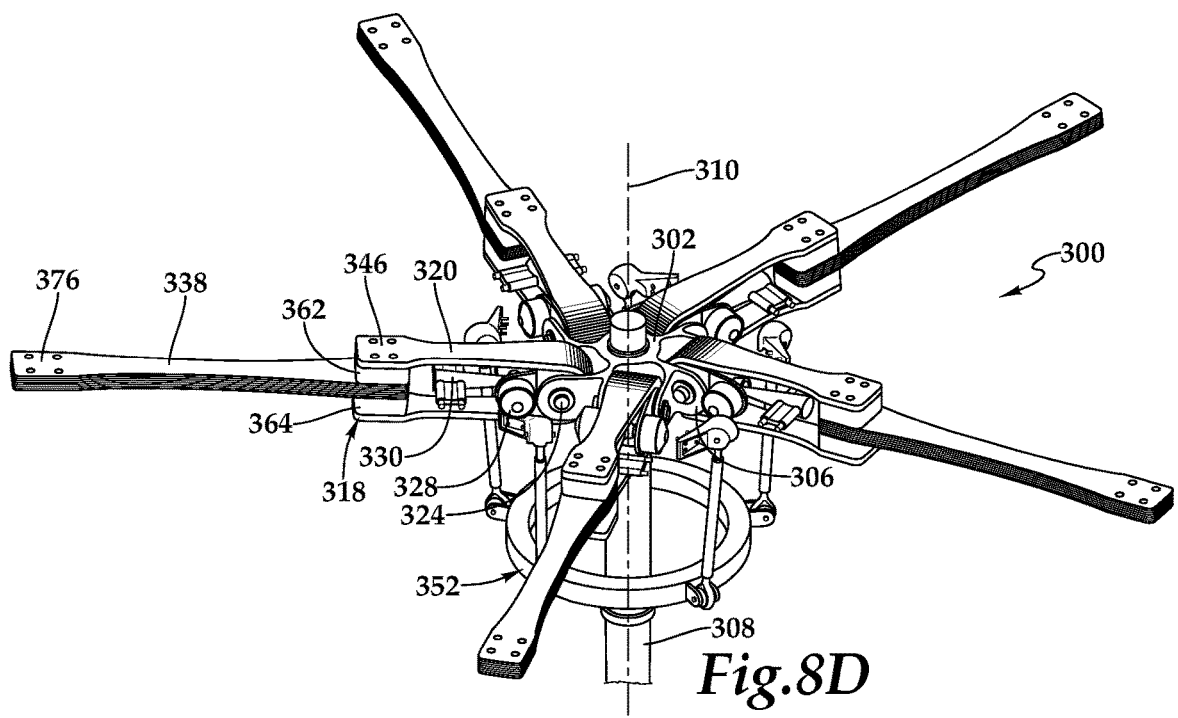

Returning to FIGS. 8A-8D, each proprotor blade 304 has a primary centrifugal force retention load path through twist shank 338 and yoke 320 to hub 102 via pins 366. Each spar 314 is also coupled to a respective blade support assembly 318 by pins 332 of blade anchor 330. As noted, each proprotor blade 304 is operable to independently pivot or flap relative to hub 302 about its respective flapping axis 326. In the illustrated embodiment, each spar 314 includes an integral pitch horn 348 that is coupled to a pitch link 350 of a pitch control assembly 352 depicted as the rotating portion of a rise and fall swash plate operable to collectively and cyclically control the pitch of proprotor blades 304. Each proprotor blade 304 is operable to independently rotate about its pitch change axis 354 relative to hub 302, thereby changing pitch responsive to changes in position of the respective pitch link 350. Pitch changes of each proprotor blade 304 cause the respective blade anchor 330 to rotate relative to the lead-lag damper 328 and cause torsional deformation of twist shank 338. As best seen in FIG. 8A, angle 356 represents the positive delta 3 configuration of the present embodiment, wherein the delta 3 angle is about positive 35 degrees. Implementing the illustrated positive delta 3 configuration enables the five blade design of proprotor system 300 while avoiding interference between pitch links 350 and other components of proprotor system 300.

Referring additionally to FIGS. 11A-11C in the drawings, the operation of an elastomeric lead-lag damper and a twist shank is depicted during in-plane oscillation of a proprotor blade. In the illustrated embodiment, proprotor blade 304 is coupled to blade support assembly 318 at pins 332 and pins 366. Blade support assembly 318 including yoke 320, flapping bearing 322, lead-lag damper 328, blade anchor 330 and twist shank 338 are coupled to hub 302 at pin 324. During operation of a proprotor system, the proprotor blades may tend to oscillate forward (see lead position in FIG. 11A) and backwards (see lag position in FIG. 11C) relative to a neutral position (see FIG. 11B) as the proprotor system rotates as a result of conservation of momentum and acceleration/deceleration caused by the Coriolis effect. As illustrated, lead-lag damper 328 has an in-plane spring rate and twist shank 338 has an in-plane spring rate that together apply a damping force to prevent excess back and forth movement of proprotor blade 304 and tune the first-in-plane lead-lag frequency of proprotor blade 304 to be below 1/rev through material selection, component sizing, component design and other factors known to those having ordinary skill in the art. For example, the first in-plane frequency of proprotor blade 304 may be between about 0.6/rev and about 0.9/rev. In this example, the first in-plane frequency of proprotor blade 304 in the helicopter mode of a tiltrotor aircraft may be between about 0.6/rev and about 0.7/rev and the first in-plane frequency of proprotor blade 304 in the airplane mode of a tiltrotor aircraft may be between about 0.8/rev and about 0.9/rev. Maintaining the first-in-plane frequency below 1.0/rev decouples the first-in-plane lead-lag frequency from the per revolution excitations frequencies and the out-of-plane flapping frequency.

In the illustrated embodiment, proprotor blade 304 has a virtual lead-lag hinge disposed along twist shank 338 depicted as lead-lag axis 356, which is normal to pitch change axis 354, pointing out of the page, as best seen in FIG. 11B. Preferably, virtual lead-lag hinge 356 is disposed between about a 15 percent station and about a 40 percent station of twist shank 338 measured from the inboard end of twist shank 338 toward the outboard end of twist shank 338. In one example, virtual lead-lag hinge 356 is disposed between about a 20 percent station and about a 30 percent station of twist shank 338. As best seen in FIG. 11A, when proprotor blade 304 moves forward in the lead position, proprotor blade 304 pivots about lead-lag axis 356 such that blade anchor extension 334 moves backwards causing spindle 358 of blade anchor 330 to shift piston 390 of lead-lag damper 328 backwards. The backwards movement of piston 390 is countered by the elastomer of lead-lag damper 328. In addition, when proprotor blade 304 moves forward in the lead position, twist shank 338 bends such that outboard end 376 also moves forward with proprotor blade 304 while inboard end 372 remains substantially fixed. The forward movement of outboard end 376 of twist shank 338 is countered by the damping force of twist shank 338. Likewise, as best seen in FIG. 11C, when proprotor blade 304 moves backwards in the lag position, proprotor blade 304 pivots about lead-lag axis 356 such that blade anchor extension 334 moves forward causing spindle 358 of blade anchor 330 to shift piston 390 of lead-lag damper 328 forward. The forward movement of piston 390 is also countered by the elastomer of lead-lag damper 328. In addition, when proprotor blade 304 moves backwards in the lag position, twist shank 338 bends such that outboard end 376 also moves backwards with proprotor blade 304 while inboard end 372 remains substantially fixed. The backwards movement of outboard end 376 of twist shank 338 is countered by the damping force of twist shank 338. In this manner, lead-lag damper 328 and twist shank 338 apply a damping force to proprotor blade 304 to prevent excess back and forth movement and to tune the first-in-plane lead-lag frequency of proprotor blade 304 to be below 1/rev.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A soft-in-plane proprotor system operable for use on a tiltrotor aircraft, the proprotor system comprising:
   a hub;
   a plurality of proprotor blades coupled to the hub such that each proprotor blade is operable to independently flap relative to the hub about a flapping axis, independently change pitch about a pitch change axis and independently oscillate in-plane about a lead-lag axis;
   a plurality of loop yokes, each coupling one of the proprotor blades with the hub and each including:
   a continuous loop having first and second longitudinal sections extending between inboard and outboard arcuate sections;
   a flapping bearing receiving region disposed at least partially within the inboard arcuate section to an interior of the continuous loop; and
   a centrifugal force bearing receiving region disposed at least partially within the outboard arcuate section to the interior of the continuous loop; and
   a plurality of bearing assemblies, each disposed within one of the continuous loops and each including:
   a flapping bearing received by the flapping bearing receiving region of the respective continuous loop and coupled to the hub;
   a lead-lag damper coupled to the hub;
   a centrifugal force bearing received by the centrifugal force bearing receiving region of the respective continuous loop; and
   a blade anchor positioned between the lead-lag damper and the centrifugal force bearing, the blade anchor coupled to the respective proprotor blade between the lead-lag damper and the centrifugal force bearing such that the respective lead-lag axis is disposed within the respective proprotor blade;
   wherein, each of the continuous loops comprises a composite material having a plurality of double bias material plies and a plurality of unidirectional material plies; and
   wherein, the number of unidirectional material plies is greater than the number of double bias material plies.

2. The proprotor system as recited in claim 1 wherein the composite material of each of the continuous loops further comprises at least two of the unidirectional material plies interposed between the double bias material plies.

3. The proprotor system as recited in claim 1 wherein the composite material of each of the continuous loops further comprises a ratio of unidirectional material plies to double bias material plies between about 2 to 1 and about 6 to 1.

4. The proprotor system as recited in claim 1 wherein the composite material of each of the continuous loops further comprises a ratio of unidirectional material plies to double bias material plies between about 3 to 1 and about 5 to 1.

5. The proprotor system as recited in claim 1 wherein the composite material of each of the continuous loops further comprises a ratio of unidirectional material plies to double bias material plies of about 4 to 1.

6. The proprotor system as recited in claim 1 wherein the double bias material plies of the composite material of each of the continuous loops further comprise double bias carbon fiber fabric.

7. The proprotor system as recited in claim 1 wherein the double bias material plies of the composite material of each of the continuous loops further comprise double bias carbon fiber fabric with plus and minus 45 degree orientation relative to a longitudinal axis of the respective continuous loop.

8. The proprotor system as recited in claim 1 wherein the unidirectional material plies of the composite material of each of the continuous loops further comprise unidirectional carbon fiber fabric.

9. The proprotor system as recited in claim 1 wherein the unidirectional material plies of the composite material of each of the continuous loops further comprise unidirectional carbon fiber fabric with 0 degree orientation parallel to a longitudinal axis of the respective continuous loop.

10. The proprotor system as recited in claim 1 wherein the first and second longitudinal sections of each of the continuous loops are generally parallel to one another.

11. The proprotor system as recited in claim 1 wherein the first and second longitudinal sections of each of the continuous loops are tapered between the inboard arcuate section and the outboard arcuate section.

12. A tiltrotor aircraft, comprising:
a fuselage;
a wing extending from the fuselage;
at least one drive system supported by at least one of the fuselage and the wing; and
at least one soft-in-plane proprotor system coupled to the drive system, the proprotor system including:
a hub;
a plurality of proprotor blades coupled to the hub such that each proprotor blade is operable to independently flap relative to the hub about a flapping axis, independently change pitch about a pitch change axis and independently oscillate in-plane about a lead-lag axis;
a plurality of loop yokes, each coupling one of the proprotor blades with the hub and each including:
a continuous loop having first and second longitudinal sections extending between inboard and outboard arcuate sections;
a flapping bearing receiving region disposed at least partially within the inboard arcuate section to an interior of the continuous loop; and
a centrifugal force bearing receiving region disposed at least partially within the outboard arcuate section to the interior of the continuous loop; and
a plurality of bearing assemblies, each disposed within one of the continuous loops and each including:
a flapping bearing received by the flapping bearing receiving region of the respective continuous loop and coupled to the hub;
a lead-lag damper coupled to the hub;
a centrifugal force bearing received by the centrifugal force bearing receiving region of the respective continuous loop; and
a blade anchor positioned between the lead-lag damper and the centrifugal force bearing, the blade anchor coupled to the respective proprotor blade between the lead-lag damper and the centrifugal force bearing such that the respective lead-lag axis is disposed within the respective proprotor blade;
wherein, each of the continuous loops comprises a composite material having a plurality of double bias material plies and a plurality of unidirectional material plies; and
wherein, the number of unidirectional material plies is greater than the number of double bias material plies.

13. The tiltrotor aircraft as recited in claim 12 wherein the composite material of each of the continuous loops further comprises at least two of the unidirectional material plies interposed between the double bias material plies.

14. The tiltrotor aircraft as recited in claim 12 wherein the composite material of each of the continuous loops further comprises a ratio of unidirectional material plies to double bias material plies between about 2 to 1 and about 6 to 1.

15. The tiltrotor aircraft as recited in claim 12 wherein the composite material of each of the continuous loops further comprises a ratio of unidirectional material plies to double bias material plies between about 3 to 1 and about 5 to 1.

16. The tiltrotor aircraft as recited in claim 12 wherein the composite material of each of the continuous loops further comprises a ratio of unidirectional material plies to double bias material plies of about 4 to 1.

17. The tiltrotor aircraft as recited in claim 12 wherein the double bias material plies of the composite material of each of the continuous loops further comprise double bias carbon fiber fabric.

18. The tiltrotor aircraft as recited in claim 12 wherein the double bias material plies of the composite material of each of the continuous loops further comprise double bias carbon fiber fabric with plus and minus 45 degree orientation relative to a longitudinal axis of the respective continuous loop.

19. The tiltrotor aircraft as recited in claim 12 wherein the unidirectional material plies of the composite material of each of the continuous loops further comprise unidirectional carbon fiber fabric.

20. The tiltrotor aircraft as recited in claim 12 wherein the unidirectional material plies of the composite material of each of the continuous loops further comprise unidirectional carbon fiber fabric with 0 degree orientation parallel to a longitudinal axis of the respective continuous loop.

* * * * *